(12) United States Patent
Mitra et al.

(10) Patent No.: US 12,255,752 B2
(45) Date of Patent: Mar. 18, 2025

(54) GROUPING DATA PACKETS AT A MODEM

(71) Applicant: QUALCOMM Incorporated, San Diego, CA (US)

(72) Inventors: Alok Mitra, San Diego, CA (US); Sitaramanjaneyulu Kanamarlapudi, San Diego, CA (US); Vamsi Dokku, San Diego, CA (US); Subash Abhinov Kasiviswanathan, Erie, CO (US)

(73) Assignee: QUALCOMM Incorporated, San Diego, CA (US)

( * ) Notice: Subject to any disclaimer, the term of this patent is extended or adjusted under 35 U.S.C. 154(b) by 27 days.

(21) Appl. No.: 17/643,375

(22) Filed: Dec. 8, 2021

(65) Prior Publication Data

US 2023/0102614 A1    Mar. 30, 2023

Related U.S. Application Data

(60) Provisional application No. 63/261,704, filed on Sep. 27, 2021.

(51) Int. Cl.
*H04L 12/28* (2006.01)
*H04L 12/54* (2022.01)
*H04L 69/22* (2022.01)
*H04L 12/70* (2013.01)

(52) U.S. Cl.
CPC ...... *H04L 12/2898* (2013.01); *H04L 12/5601* (2013.01); *H04L 69/22* (2013.01); *H04L 12/2801* (2013.01); *H04L 2012/5652* (2013.01)

(58) Field of Classification Search
CPC . H04L 12/2898; H04L 69/22; H04L 12/2801; H04L 49/90; H04L 2212/00; H04L 47/43; H04L 69/161; H04L 69/166; H04L 47/193; H04L 1/1835; H04W 28/0278; G06F 9/544; H04N 21/44004
See application file for complete search history.

(56) References Cited

U.S. PATENT DOCUMENTS

| 7,620,071 | B2 * | 11/2009 | Makineni | H04L 49/20 370/476 |
| 8,108,545 | B2 * | 1/2012 | Arimilli | H04L 67/10 709/224 |
| 8,311,059 | B2 * | 11/2012 | Williams | H04L 49/9094 370/469 |

(Continued)

OTHER PUBLICATIONS

International Search Report and Written Opinion—PCT/US2022/074970—ISA/EPO—Nov. 4, 2022.

*Primary Examiner* — Alex H. Tran
(74) *Attorney, Agent, or Firm* — Kevin M. Donnelly; Harrity & Harrity, LLP

(57) ABSTRACT

Various aspects of the present disclosure generally relate to wireless communication. In some aspects, a device may receive, at a modem of the device, a plurality of data packets associated with one or more connections. The device may group, at the modem of the device, data packets, of the plurality of data packets, associated with a connection, of the one or more connections, into a container based at least in part on one or more characteristics associated with the modem or the data packets. The device may transmit, from the modem to a processor of the device, the container of grouped data packets. Numerous other aspects are provided.

30 Claims, 10 Drawing Sheets

(56) References Cited

U.S. PATENT DOCUMENTS

| | | | | |
|---|---|---|---|---|
| 8,498,305 | B1* | 7/2013 | Goel | H04L 47/29 |
| | | | | 370/473 |
| 8,976,724 | B2* | 3/2015 | Hauser | H04W 88/04 |
| | | | | 370/467 |
| 8,996,718 | B2* | 3/2015 | Biswas | H04L 47/365 |
| | | | | 709/232 |
| 9,350,683 | B2* | 5/2016 | Hui | H04L 49/20 |
| 10,212,623 | B2* | 2/2019 | Ben-Haim | H04L 69/22 |
| 10,375,035 | B2* | 8/2019 | Chen | H04L 63/0428 |
| 10,447,598 | B2* | 10/2019 | Snapy | H04L 67/561 |
| 10,552,350 | B2* | 2/2020 | Zheng | G06F 1/08 |
| 10,645,200 | B2* | 5/2020 | Gil | G06F 13/128 |
| 10,764,781 | B2* | 9/2020 | Mitra | H04W 28/06 |
| 10,938,965 | B2* | 3/2021 | Pismenny | H04L 69/16 |
| 11,321,255 | B2* | 5/2022 | Kawamura | G06F 13/28 |
| 11,528,641 | B2* | 12/2022 | Mitra | H04L 69/16 |
| 2006/0047849 | A1* | 3/2006 | Mukherjee | G06F 15/17375 |
| | | | | 709/238 |
| 2019/0044889 | A1* | 2/2019 | Serres | H04L 49/901 |
| 2020/0120190 | A1* | 4/2020 | Cornett | G06F 9/45558 |
| 2021/0029587 | A1 | 1/2021 | Mitra et al. | |
| 2021/0377787 | A1* | 12/2021 | Zhuo | H04W 28/0278 |
| 2022/0021629 | A1* | 1/2022 | Yefet | H04L 69/22 |
| 2022/0329661 | A1* | 10/2022 | Noland | H04L 43/028 |

\* cited by examiner

GROUPING DATA PACKETS AT A MODEM

CROSS-REFERENCE TO RELATED APPLICATION

This patent application claims priority to U.S. Provisional Patent Application No. 63/261,704, filed on Sep. 27, 2021, entitled "GROUPING DATA PACKETS AT A MODEM," and assigned to the assignee hereof. The disclosure of the prior application is considered part of and is incorporated by reference into this patent application.

FIELD OF THE DISCLOSURE

Aspects of the present disclosure generally relate to wireless communication and specifically, to techniques and apparatuses for grouping data packets at a modem.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth or transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different user equipment (UEs) to communicate on a municipal, national, regional, or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

A modem of a device may receive a plurality of data packets associated with one or more connections. The modem may group or coalesce data packets, of the plurality of packets, to form grouped data packets. The grouped data packets may be associated with a connection of the one or more connections. The modem may insert the grouped data packets into a container. The modem may transmit, to a processor of the device, the container that includes the grouped data packets. The processor may process the container that includes the grouped data packets, as opposed to processing individual data packets separately, which may improve an operation of the processor.

In some cases, the modem may always group the plurality of data packets associated with the one or more connections. For example, for each connection, the modem may always group corresponding data packets for transmission to the processor. However, in some cases, grouping data packets may actually deteriorate an operation of the modem or the processor (for example, grouping data packets may result in under-used buffers or dropped data packets). Some data packets may be better suited to not be grouped together, but the modem may be unable to differentiate which data packets should be grouped together versus which data packets should not be grouped together.

SUMMARY

Some aspects described herein relate to an apparatus for wireless communication at a device. The device may include a memory, a processor, and a modem. The modem may receive a plurality of data packets associated with one or more connections. The modem may group data packets, of the plurality of data packets, associated with a connection, of the one or more connections, into a container based at least in part on one or more characteristics associated with the modem or the data packets. The modem may transmit, to the processor, the container of grouped data packets.

Some aspects described herein relate to a method of wireless communication performed by a device. The method may include receiving, at a modem of the device, a plurality of data packets associated with one or more connections. The method may include grouping, at the modem of the device, data packets, of the plurality of data packets, associated with a connection, of the one or more connections, into a container based at least in part on one or more characteristics associated with the modem or the data packets. The method may include transmitting, from the modem to a processor of the device, the container of grouped data packets.

Some aspects described herein relate to a non-transitory computer-readable medium storing a set of instructions for wireless communication. The non-transitory computer-readable medium may include one or more instructions that, when executed by one or more processors of a device, cause the device to receive, at a modem of the device, a plurality of data packets associated with one or more connections. The one or more instructions, when executed by the one or more processors of a device, may cause the device to group, at the modem of the device, data packets, of the plurality of data packets, associated with a connection, of the one or more connections, into a container based at least in part on one or more characteristics associated with the modem or the data packets. The one or more instructions, when executed by the one or more processors of a device, may cause the device to transmit, from the modem to a processor of the device, the container of grouped data packets.

Some aspects described herein relate to an apparatus for wireless communication. The apparatus may include means for receiving, at a modem of the apparatus, a plurality of data packets associated with one or more connections. The apparatus may include means for grouping, at the modem of the apparatus, data packets, of the plurality of data packets, associated with a connection, of the one or more connections, into a container based at least in part on one or more characteristics associated with the modem or the data packets. The apparatus may include means for transmitting, from the modem to a processor of the apparatus, the container of grouped data packets.

Aspects generally include a method, apparatus, system, computer program product, non-transitory computer-readable medium, user equipment, base station, wireless communication device, or processing system as substantially described with reference to and as illustrated by the drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
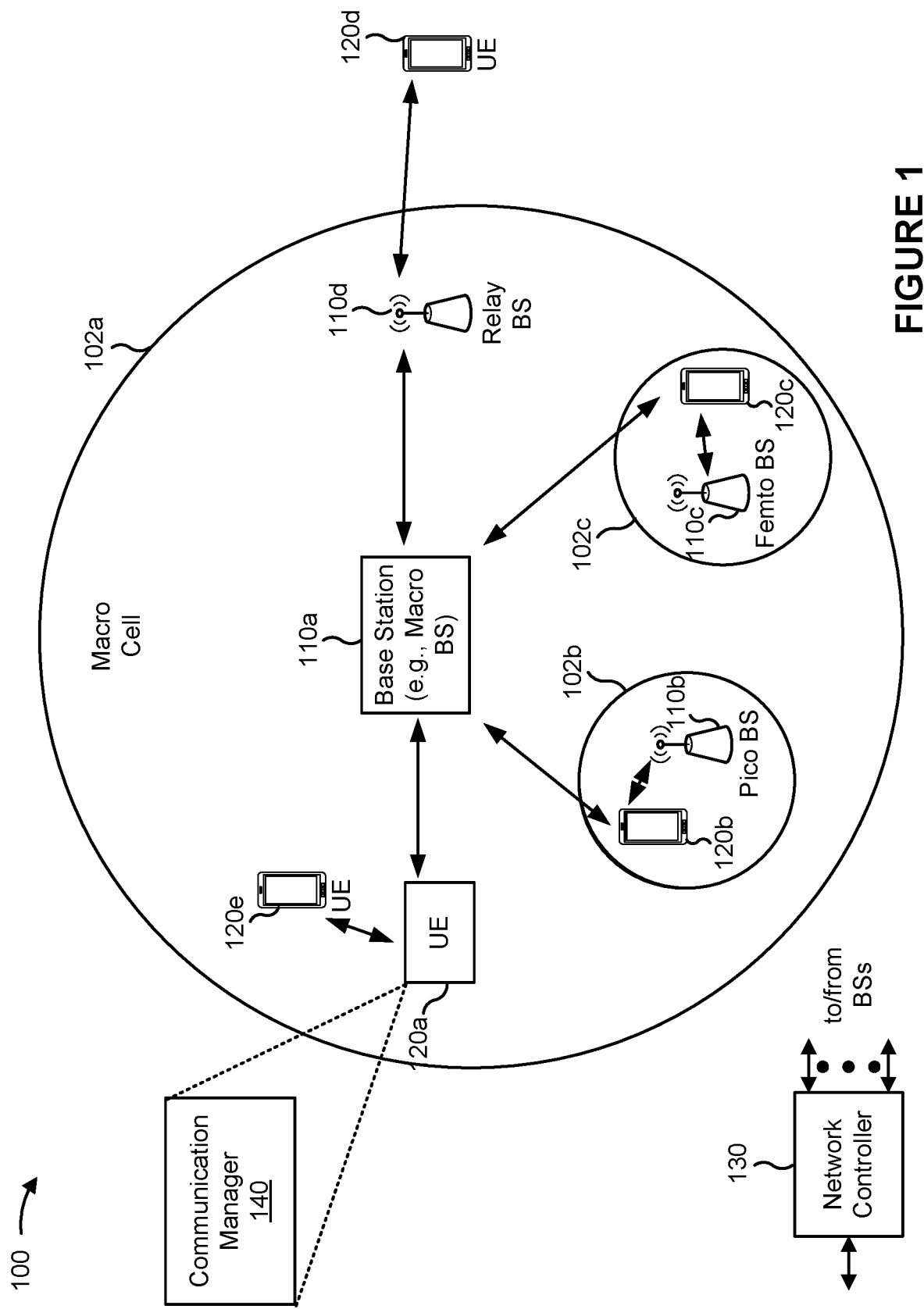
FIG. 1 is a diagram illustrating an example of a wireless network in accordance with the present disclosure.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

Various aspects relate generally to grouping (or coalescing) data packets into a container based at least in part on one or more characteristics associated with a modem or the data packets. The modem may be responsible for grouping the data packets, and for transmitting grouped data packets to a processor. The modem and the processor may both be included in a device, such as a user equipment (UE), a base station, or a network controller. Some aspects more specifically relate to determining whether or not to group the data packets based at least in part on the one or more characteristics, which may be related to a buffer efficiency of a buffer associated with the modem, a quantity of active connections associated with the modem, a traffic pattern of the data packets, a context identifier associated with a connection for which the data packets are received, Internet Protocol identifiers associated with the data packets, checksum errors associated with the data packets, sizes of headers associated with the data packets, or a presence of special flags in the data packets.

In some aspects, the modem may determine, in a dynamic manner, whether or not to group the data packets depending on the one or more characteristics associated with the modem or the data packets. The modem may determine whether or not to group the data packets on a per connection basis. For example, the modem may group data packets for one connection, but may not group data packets for another connection. The modem may determine to group the data packets associated with the connection using a specific context, while other contexts may be interchangeably used for other active connections.

Particular aspects of the subject matter described in this disclosure can be implemented to realize one or more of the following potential advantages. In some examples, the described techniques can be used to improve an operation of the modem or the processor in the device based on grouping only data packets that are well suited for grouping, and not grouping data packets that are not well suited for grouping on a dynamic basis. As a result, the modem may not group data packets and the processor may not process data packets that should not be combined together, which may result in a higher throughput due to a higher buffer efficiency at the modem and a reduced quantity of dropped data packets (for example, data packets that are not received at the processor).

FIG. 1 is a diagram illustrating an example of a wireless network in accordance with the present disclosure. The wireless network 100 may be or may include elements of a 5G (for example, NR) network or a 4G (for example, Long Term Evolution (LTE)) network, among other examples. The wireless network 100 may include one or more base stations 110 (shown as a BS 110a, a BS 110b, a BS 110c, and a BS 110d), a UE 120 or multiple UEs 120 (shown as a UE 120a, a UE 120b, a UE 120c, a UE 120d, and a UE 120e), or other network entities. A base station 110 is an entity that communicates with UEs 120. A base station 110 (sometimes referred to as a BS) may include, for example, an NR base station, an LTE base station, a Node B, an eNB (for example, in 4G), a gNB (for example, in 5G), an access point, or a transmission reception point (TRP). Each base station 110 may provide communication coverage for a particular geographic area. In the Third Generation Partnership Project (3GPP), the term "cell" can refer to a coverage area of a base station 110 or a base station subsystem serving this coverage area, depending on the context in which the term is used.

A base station 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (for example, a home) and may allow restricted access by UEs 120 having association with the femto cell (for example, UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station.

The wireless network 100 may be a heterogeneous network that includes base stations 110 of different types, such as macro base stations, pico base stations, femto base stations, or relay base stations. These different types of base stations 110 may have different transmit power levels, different coverage areas, or different impacts on interference in the wireless network 100. For example, macro base stations may have a high transmit power level (for example, 5 to 40 watts) whereas pico base stations, femto base stations, and relay base stations may have lower transmit power levels (for example, 0.1 to 2 watts). In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (for example, three) cells. A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

In some examples, a cell may not necessarily be stationary, and the geographic area of the cell may move in accordance with the location of a base station 110 that is mobile (for example, a mobile base station). In some examples, the base stations 110 may be interconnected to one another or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (for example, a base station 110 or a UE 120) and send a transmission of the data to a downstream station (for example, a UE 120 or a base station 110). A relay station may be a UE 120 that can relay transmissions for other UEs 120. In the example shown in FIG. 1, the BS 110d (for example, a relay base station) may communicate with the BS 110a (for example, a macro base station) and the UE 120d in order to facilitate communication between the BS 110a and the UE 120d. A base station 110 that relays communications may be referred to as a relay station, a relay base station, or a relay.

The UEs 120 may be dispersed throughout the wireless network 100, and each UE 120 may be stationary or mobile. A UE 120 may include, for example, an access terminal, a terminal, a mobile station, or a subscriber unit. A UE 120 may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, smart jewelry (for example, a smart ring or a smart bracelet)), an entertainment device (for example, a music device, a video device, or a satellite radio), a vehicular component or sensor, a smart meter/sensor, industrial manufacturing equipment, a global positioning system device, or any other suitable device that is configured to communicate via a wireless medium.

Some UEs 120 may be considered machine-type communication (MTC) or evolved or enhanced machine-type communication (eMTC) UEs. An MTC UE or an eMTC UE may include, for example, a robot, a drone, a remote device, a sensor, a meter, a monitor, or a location tag, that may communicate with a base station, another device (for example, a remote device), or some other entity. Some UEs 120 may be considered Internet-of-Things (IoT) devices, or may be implemented as NB-IoT (narrowband IoT) devices. Some UEs 120 may be considered a Customer Premises Equipment. A UE 120 may be included inside a housing that houses components of the UE 120, such as processor components or memory components. In some examples, the processor components and the memory components may be coupled together. For example, the processor components (for example, one or more processors) and the memory components (for example, a memory) may be operatively coupled, communicatively coupled, electronically coupled, or electrically coupled.

In general, any quantity of wireless networks 100 may be deployed in a given geographic area. Each wireless network 100 may support a particular RAT and may operate on one or more frequencies. A RAT may be referred to as a radio technology or an air interface. A frequency may be referred to as a carrier or a frequency channel. Each frequency may support a single RAT in a given geographic area in order to avoid interference between wireless networks of different RATs. In some cases, NR or 5G RAT networks may be deployed.

In some examples, two or more UEs 120 (for example, shown as UE 120a and UE 120e) may communicate directly using one or more sidelink channels (for example, without using a base station 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or a vehicle-to-pedestrian (V2P) protocol), or a mesh network. In such examples, a UE 120 may perform scheduling operations, resource selection operations, or other operations described elsewhere herein as being performed by the base station 110.

Devices of the wireless network 100 may communicate using the electromagnetic spectrum, which may be subdivided by frequency or wavelength into various classes, bands, or channels. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs in connection with FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics or FR2 characteristics, and thus may effectively extend features of FR1 or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz," if used herein, may broadly represent frequencies that may be less than 6 GHz, may be within FR1, or may include mid-band frequencies. Further, unless specifically stated otherwise, it should be understood that the term "millimeter wave," if used herein, may broadly represent frequencies that may include mid-band frequencies, may be within FR2, FR4, FR4-a or FR4-1, or FR5, or may be within the EHF band. It is contemplated that the frequencies included in these operating bands (for example, FR1, FR2, FR3, FR4, FR4-a, FR4-1, or FR5) may be modified, and techniques described herein are applicable to those modified frequency ranges.

In some aspects, a device (for example, base station 110, UE 120, or network controller 130) may include a communication manager 140. As described in more detail elsewhere herein, the communication manager 140 may receive, at a modem of the device, a plurality of data packets associated with one or more connections; group, at the modem of the device, data packets, of the plurality of data packets, associated with a connection, of the one or more connections, into a container based at least in part on one or more characteristics associated with the modem or the data packets; and transmit, from the modem to a processor of the device, the container of grouped data packets. Additionally or alternatively, the communication manager 140 may perform one or more other operations described herein.

Figure 2:
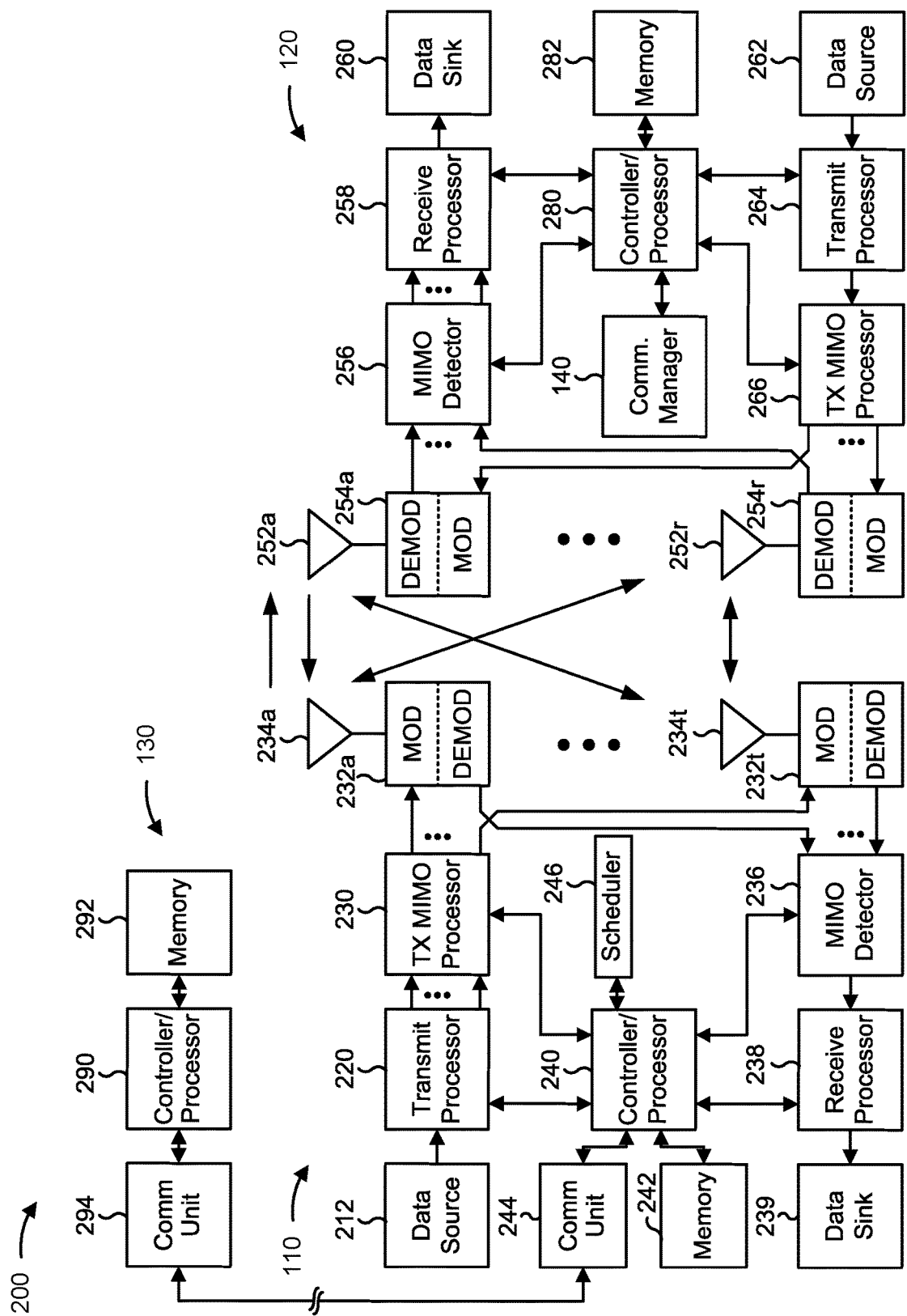
FIG. 2 is a diagram illustrating an example base station in communication with a user equipment (UE) in a wireless network in accordance with the present disclosure.

FIG. 2 is a diagram illustrating an example base station in communication with a UE in a wireless network in accordance with the present disclosure. The base station may correspond to the base station 110 of FIG. 1. Similarly, the UE may correspond to the UE 120 of FIG. 1. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (for example, encode and modulate) the data for the UE 120 based at least in part on the MCS(s) selected for the UE 120 and may provide data symbols for the UE 120. The transmit processor 220 may process system information (for example, for semi-static resource partitioning information (SRPI)) and control information (for example, CQI requests, grants, or upper layer signaling) and provide overhead symbols and control symbols. The transmit processor 220 may generate reference symbols for reference signals (for example, a cell-specific reference signal (CRS) or a demodulation reference signal (DMRS)) and synchronization signals (for example, a primary synchronization signal (PSS) or a secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide a set of output symbol streams (for example, T output symbol streams) to a corresponding set of modems 232 (for example, T modems), shown as modems 232a through 232t. For example, each output symbol stream may be provided to a modulator component (shown as MOD) of a modem 232. Each modem 232 may use a respective modulator component to process a respective output symbol stream (for example, for OFDM) to obtain an output sample stream. Each modem 232 may further use a respective modulator component to process (for example, convert to analog, amplify, filter, or upconvert) the output sample stream to obtain a downlink signal. The modems 232a through 232t may transmit a set of downlink signals (for example, T downlink signals) via a corresponding set of antennas 234 (for example, T antennas), shown as antennas 234a through 234t.

At the UE 120, a set of antennas 252 (shown as antennas 252a through 252r) may receive the downlink signals from the base station 110 or other base stations 110 and may provide a set of received signals (for example, R received signals) to a set of modems 254 (for example, R modems), shown as modems 254a through 254r. For example, each received signal may be provided to a demodulator component (shown as DEMOD) of a modem 254. Each modem 254 may use a respective demodulator component to condition (for example, filter, amplify, downconvert, or digitize) a received signal to obtain input samples. Each modem 254 may use a demodulator component to further process the input samples (for example, for OFDM) to obtain received symbols. A MIMO detector 256 may obtain received symbols from the modems 254, may perform MIMO detection on the received symbols if applicable, and may provide detected symbols. A receive processor 258 may process (for example, demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, or a CQI parameter, among other examples. In some examples, one or more components of the UE 120 may be included in a housing.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (for example, antennas 234a through 234t or antennas 252a through 252r) may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled to one or more transmission or reception components, such as one or more components of FIG. 2.

On the uplink, at the UE 120, a transmit processor 264 may receive and process data from a data source 262 and control information (for example, for reports that include RSRP, RSSI, RSRQ, or CQI) from the controller/processor 280. The transmit processor 264 may generate reference symbols for one or more reference signals. The symbols from the transmit processor 264 may be precoded by a TX MIMO processor 266 if applicable, further processed by the modems 254 (for example, for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, or the TX MIMO processor 266. The transceiver may be used by a processor (for example, the controller/processor 280) and the memory 282 to perform aspects of any of the methods described herein.

At the base station 110, the uplink signals from UE 120 or other UEs may be received by the antennas 234, processed by the modem 232 (for example, a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, or the TX MIMO processor 230. The transceiver may be used by a processor (for example, the controller/processor 240) and the memory 242 to perform aspects of any of the methods described herein.

The controller/processor 240 of the base station 110, the controller/processor 280 of the UE 120, or any other component(s) of FIG. 2 may perform one or more techniques associated with grouping data packets at a modem, as described in more detail elsewhere herein. In some aspects, the device described herein is the base station 110, is included in the base station 110, or includes one or more components of the base station 110 shown in FIG. 2. In some aspects, the device described herein is the UE 120, is included in the UE 120, or includes one or more components of the UE 120 shown in FIG. 2. For example, the controller/processor 240 of the base station 110, the controller/processor 280 of the UE 120, or any other component(s) of FIG. 2 may perform or direct operations of, for example, process 900 of FIG. 9, or other processes as described herein. The memory 242 and the memory 282 may store data and program codes for the base station 110 and the UE 120, respectively. In some examples, the memory 242 or the memory 282 may include a non-transitory computer-readable medium storing one or more instructions (for example, code or program code) for wireless communication. For example, the one or more instructions, when executed (for example, directly, or after compiling, converting, or interpreting) by one or more processors of the base station 110 or the UE 120, may cause the one or more processors, the UE 120, or the base station 110 to perform or direct operations of, for example, process 900 of FIG. 9, or other processes as described herein. In some examples, executing instructions may include running the instructions, converting the instructions, compiling the instructions, or interpreting the instructions, among other examples.

In some aspects, a device (for example, base station 110, UE 120, or network controller 130) includes means for receiving, at a modem of the device, a plurality of data packets associated with one or more connections; means for grouping, at the modem of the device, data packets, of the plurality of data packets, associated with a connection, of the one or more connections, into a container based at least in part on one or more characteristics associated with the modem or the data packets; or means for transmitting, from the modem to a processor of the device, the container of grouped data packets. In some aspects, the means for the device to perform operations described herein may include, for example, one or more of transmit processor 220, TX MIMO processor 230, modem 232, antenna 234, MIMO detector 236, receive processor 238, controller/processor 240, memory 242, or scheduler 246. In some aspects, the means for the device to perform operations described herein may include, for example, one or more of antenna 252, modem 254, MIMO detector 256, receive processor 258, transmit processor 264, TX MIMO processor 266, controller/processor 280, or memory 282.

A device (for example, a UE 120, a base station 110, or a network controller 130) may communicate with another device over a wireless network using various communication protocols. For example, a device may transmit data packets to or receive data packets from another device using one or more of transmission control protocol (TCP), user datagram protocol (UDP), or Internet protocol (IP). A modem of the device may transfer a received data packet to a processor (for example, an application processor or a host processor) of the device. The processor may process the data packet through one or more layers of a network protocol stack (for example, a TCP/IP-based stack, a UDP-based stack, or an open systems interconnection (OSI)-based stack) in order to strip one or more headers of the data packet and obtain a payload of the data packet.

The processor may reduce processing inefficiencies or decrease data packet processing times by offloading data packet grouping to the modem. The modem, for example, may combine, coalesce, or otherwise group data packets belonging to a particular flow or connection into a container (for example, a coalesced TCP frame, or a grouped or boxed UDP datagram), where the modem may receive the data packets from another device via the wireless network. A combining or coalescing of the data packets may be referred to as receive side coalescing (RSC). The data packets that are combined may associated with consecutive data segments. The modem may provide the container of grouped data packets to the processor for processing through a network protocol stack. The container may have a common header (or headers) such that the processor only needs to strip or remove one header (or one set of headers) from the container as opposed to individual headers (or sets of headers) from each data packet.

The modem may provide an indication to the processor regarding containers of grouped data packets based at least in part on received sequences of corresponding data packets. Moreover, the modem may provide information associated with the containers such that ungrouping, uncoalescing, or unboxing may be performed.

The modem may perform checksum offloading for containers of grouped data packets. The modem may provide an indication of checksum correctness for a container to the processor such that the processor may take an appropriate action for data packets having an incorrect checksum.

The modem may transfer containers of grouped data packets to the processor via a first interface channel (for example, a coalescing interface channel) and transfer individual data packets (for example, non-coalesceable or non-groupable data packets) to the processor via a second interface channel (for example, a non-coalescing interface channel), while maintaining an order of grouped data packets and non-grouped data packets.

Figure 3:
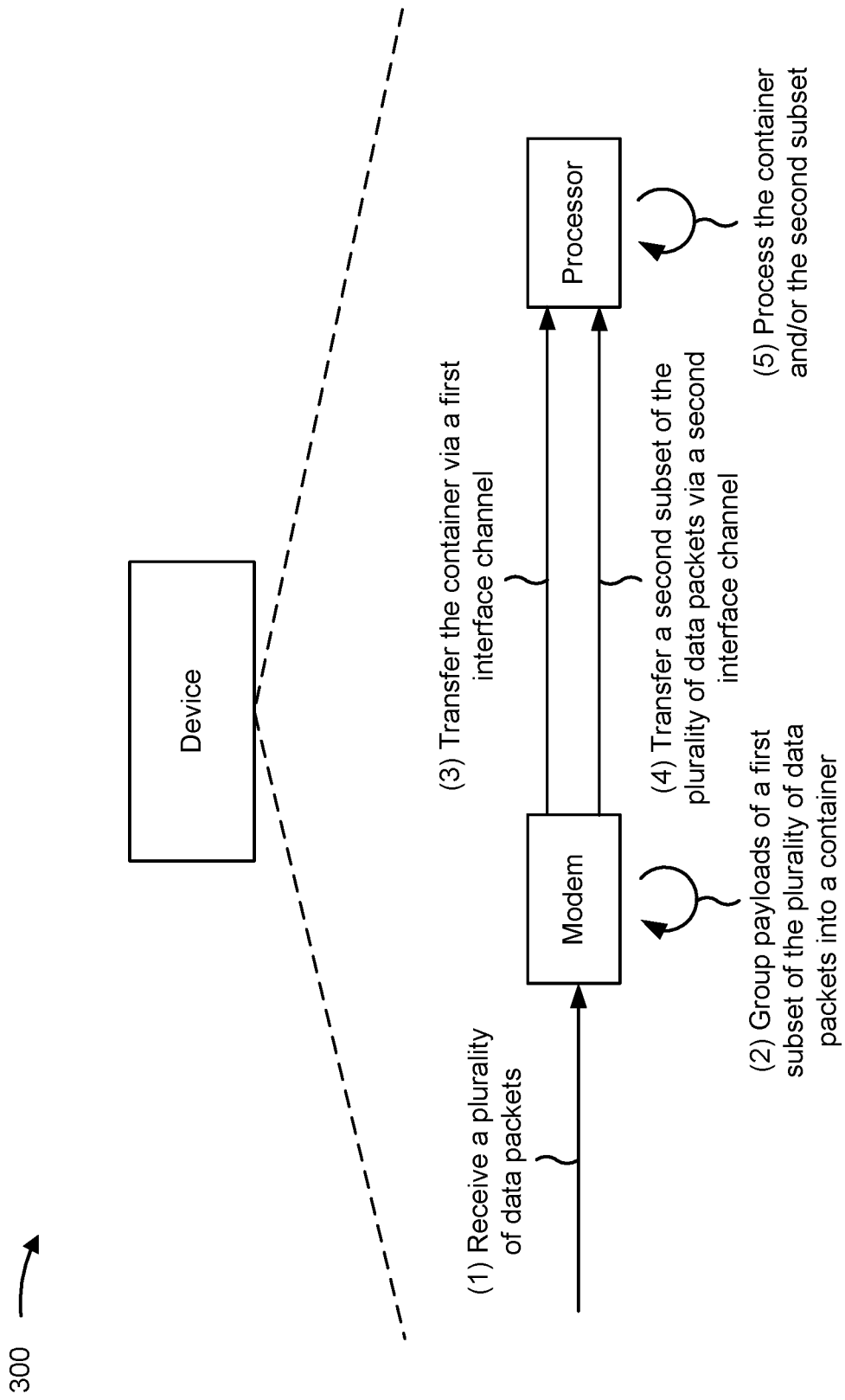
FIGS. 3-5 are diagrams illustrating examples of transmission control protocol (TCP) or user datagram protocol (UDP) receive offloading in accordance with the present disclosure.

FIG. 3 is a diagram illustrating an example 300 of TCP or UDP receive offloading, in accordance with the present disclosure. As shown in FIG. 3, example 300 may include communication or processing of data packets by a device (for example, a UE 120, a base station 110, or a network controller 130). The modem may be included in the device or may be communicatively connected to the device. The processor may be a host processor or an application processor.

In a first operation, the device may receive a plurality of data packets at the modem of the device. The device may receive the plurality of data packets from another device. The plurality of data packets may be transmitted to the device via a data network (for example, the Internet or another type of packet data network), a wireless network (for example, wireless network 100), or a base station (for example, base station 110).

The data packets may include TCP segments, UDP packets, TCP acknowledgements, Ethernet frames, or data packets associated with an unstructured data flow. Each data packet may include a payload (for example, application data or other types of data) that is wrapped in one or more headers. The one or more headers may include network protocol stack headers, such as a transport layer header (for example, a TCP/IP header, a UDP header, or an Ethernet header), a network layer header (for example, or an IP header), or a link layer header.

In a second operation, the modem may perform receive offloading for the processor by grouping payloads of at least a first subset of the plurality of data packets into a container. The receive offloading for the processor by grouping the payloads may be referred to as RSC. The modem may determine to group the payloads of the first subset of the plurality of data packets into the container based at least in part on determining that the first subset of the plurality of data packets are groupable or coalesceable. The modem may determine that the first subset of the plurality of data packets are groupable or coalesceable, for example, when the IP headers of the data packets have the same identifier field value or sequential identifiers, when the IP headers of the data packets differ only in payload length, when the TCP or UDP headers of the data packets differ only in sequence identifier, acknowledgement identifier or checksum, or when the TCP or UDP headers differ only in length. The modem may determine that the first subset of the plurality of data packets are not groupable or coalesceable, for example, when the data packets are IP fragments, when one or more of the data packets produce a checksum error, when padding is added to one or more of the data packets, when TCP options differ between the data packets, when the network protocol stack headers of one or more of the data packets do not satisfy a threshold size, or when TCP sequence numbers of one or more of the data packets are not consecutive with other data packets.

The first subset of the plurality of data packets may include a plurality of TCP segments. The modem may group the payloads of the plurality of TCP segments into the container based at least in part on determining that the plurality of TCP segments may be associated with the same TCP flow or same TCP connection. When the collective size (for example, in bits, bytes, or kilobytes) of the payloads of the plurality of TCP segments satisfies a threshold size (for example, 32 kB or 64 kB), the modem may group subsets of the payloads of the plurality of TCP segments into different containers.

When the first subset of the plurality of data packets includes a plurality of TCP segments, the container may include a coalesced TCP frame. The modem may group or coalesce the plurality of TCP segments into the coalesced TCP frame by generating a single common coalescing frame header or a common set of network protocol stack headers (for example, by grouping the plurality of TCP segments under the network protocol stack headers of a first TCP segment) and wrapping the coalesced TCP frame in the coalescing frame header, which may reduce the quantity of headers that the processor is to remove or strip from the plurality of TCP segments.

The first subset of the plurality of data packets may include a plurality of UDP packets. The modem may group the payloads of the plurality of UDP packets into the container based at least in part on determining that the plurality of UDP packets may be associated with the same UDP stream or same UDP connection. In some aspects, if the collective size (in bits, bytes, or kilobytes) of the payloads of the plurality of UDP packets satisfies a threshold size, the modem may group subsets of the payloads of the plurality of UDP packets into different containers.

When the first subset of the plurality of data packets includes a plurality of UDP packets, the container may include a grouped or boxed UDP datagram. The modem may group or coalesce the plurality of UDP packets into the grouped UDP datagram by generating a single common grouping UDP header or a common set of network protocol stack headers (for example, by grouping the plurality of UDP packets under the network protocol stack headers of a first UDP packet) and wrapping the grouped UDP datagram in the grouping UDP header, which reduces the quantity of headers that the processor is to remove or strip from the plurality of UDP packets.

The modem may group the payloads of the first subset of the plurality of data packets into the container such that the container has a plurality of headers. The plurality of headers may be a plurality of common coalescing frame headers, a plurality of grouping UDP headers, the original headers of the plurality of data packets (for example, such that the plurality of data packets are accumulated per flow as opposed to being coalesced), or other types of headers.

In a third operation, the modem may transfer the container to the processor via a first interface channel (for example, a coalescing interface channel), or in a fourth operation, the modem may transfer a second subset of the plurality of data packets to the processor via a second interface channel (for example, a non-coalescing interface channel). The second subset of the plurality of data packets may be non-coalesced data packets. The modem may transfer the second subset of the plurality of data packets via the second interface channel based at least in part on determining not to coalesce or group the second subset of the plurality of data packets into a container, based at least in part on determining that the second subset of the plurality of data packets are non-coalesceable or non-groupable data packets (for example, data packets that are not capable of being grouped or coalesced).

The first interface channel and the second interface channel may be different interface channels. An interface associated with the first interface channel and the second interface channel may be a peripheral component interconnect express (PCIe) interface, a universal serial bus (USB) interface, a serial ATA (SATA) interface, an Ethernet interface, a WiFi interface, a local area network (LAN) interface, a Bluetooth interface, a Zigbee interface, or another type of communication interface. The interface may be associated with an extendable interconnect.

The modem may transfer a plurality of containers via the first interface channel or a plurality of non-coalesced or non-grouped data packets to the processor via the second interface channel. In this case, one or more of the plurality of containers may be associated with the same TCP flow or TCP connection, may be associated with different TCP flows or different TCP connections, may be associated with the same UDP stream or UDP connection, or may be associated with different UDP streams or different UDP connections.

In a fifth operation, the processor may process the container or the second subset of the plurality of data packets. For example, the processor may process the container through one or more layers of a network protocol stack by removing or stripping the common frame header or common UDP header from the container or other common network protocol stack headers from the container to obtain the application data or other payload data included in the container. The processor may deliver the application data or other payload data to an application executing on the device. As another example, the processor may process the second subset of the plurality of data packets through one or more layers of a network protocol stack by removing or stripping the individual network protocol stack headers from the second subset of the plurality of data packets to obtain the application data or other payload data included in the second subset of the plurality of data packets.

In this way, the processor may reduce processing inefficiencies or decrease data packet processing times by offloading data packet grouping to the modem. The modem, for example, may combine, coalesce, or otherwise group data packets belonging to a particular flow or connection into a container (for example, a coalesced TCP frame, or a grouped or boxed UDP datagram), and may provide the container of grouped data packets to the processor for processing through a network protocol stack. The container may have a common header (or headers) such that the processor needs to strip or remove a single header (or a single set of headers) from the container as opposed to individual headers (or sets of headers) from each data packet.

Figure 4:
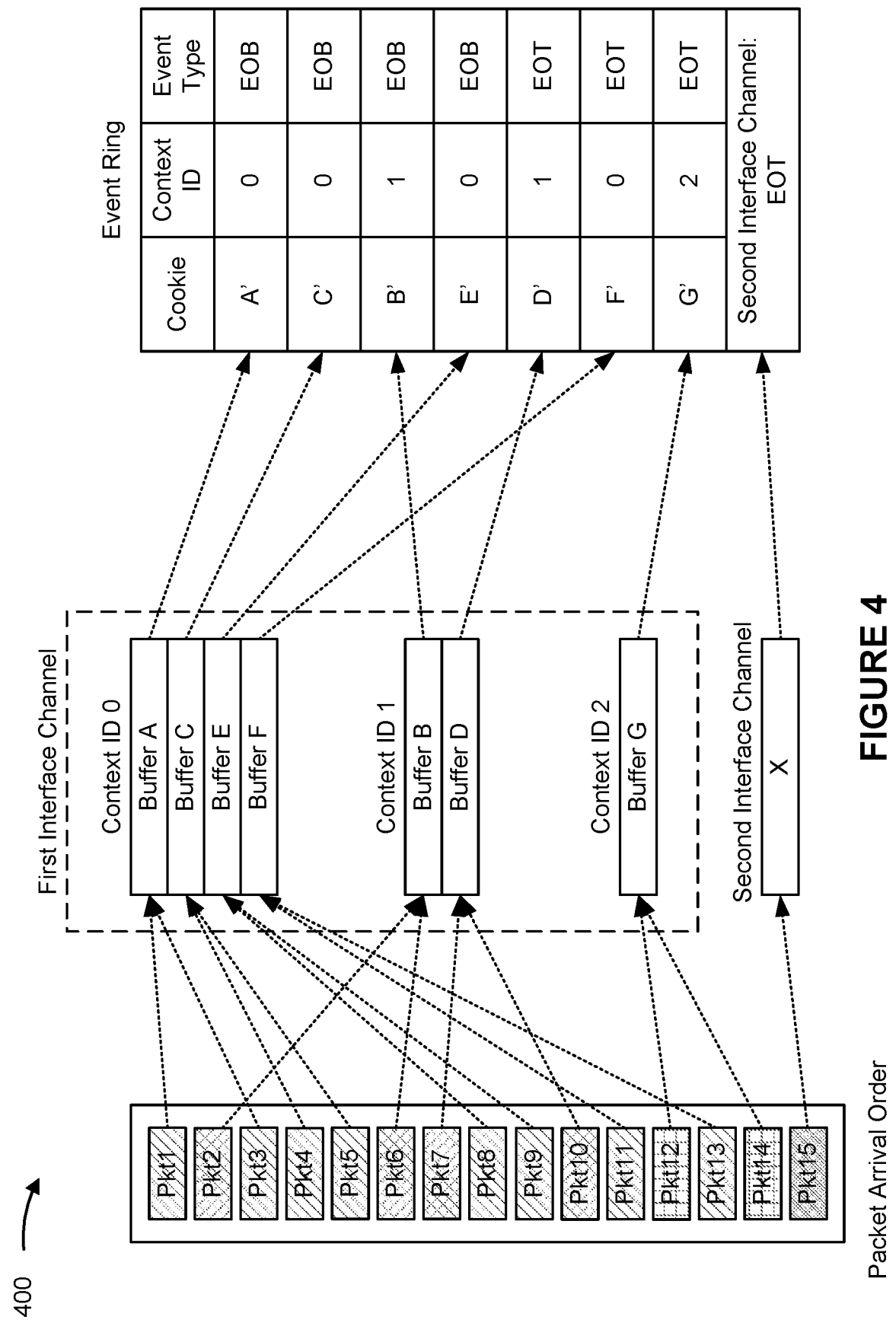

FIG. 4 is a diagram illustrating an example 400 of TCP or UDP receive offloading, in accordance with the present disclosure.

A device (for example, the device described above in connection with FIG. 3 or another device) may receive a plurality of data packets (for example, Packet 1 through Packet 15) at a modem of the device in a particular packet arrival order. The modem may group subsets of the plurality of data packets into a plurality of containers, may transfer the containers to a processor of the device via a first interface channel (for example, a coalescing interface channel), and may transfer a subset of the plurality of data packets (for example, non-grouped or non-coalesced data packets) to the processor via a second interface channel (for example, a non-coalescing interface channel).

The device may utilize a plurality of concurrent coalescing interface channels (or groups of coalescing interface channels) or non-coalescing interface channels (or groups of non-coalescing interface channels) to permit per-processor usage in a multi-processor device.

Each container of the plurality of containers may be associated with a coalescing context identifier. For example, a first container may be associated with context identifier 0, a second container may be associated with context identifier 1, and so on.

To transfer the plurality of containers to the processor, the modem may store the plurality of containers across one or more buffers associated with the first interface channel. For example, the modem may store a container across a single buffer or may store a container across a plurality of buffers.

As an example, the modem may store the data packets included in the container associated with context identifier 0 in buffer A (for example, packet 1 and packet 3), buffer C (for example, packet 4 and packet 5), buffer E (for example, packet 8 and packet 9), and buffer F (for example, packet 11 and packet 13). The modem may store the data packets included in the container associated with context identifier 1 in buffer B (for example, packet 2 and packet 6) and buffer D (for example, packet 7 and packet 10). The modem may store the data packets included in the container associated with context identifier 2 in buffer G (for example, packet 12 and packet 14). The modem may store the non-grouped or non-coalesced data packets in a buffer associated with the second interface channel.

The modem may utilize buffers out of order to store data packets, whereas the non-grouped or non-coalesced data packets may be stored in the buffer associated with the second interface channel in the order in which the non-grouped or non-coalesced data packets are received. As an example, when the modem receives packet 1, the modem may assign a free buffer (for example, buffer A) to a container associated with context identifier 0 and may store packet 1 in buffer A. The next packet (for example, packet 2) that the modem receives may be associated with a different TCP flow or UDP stream, in which case the modem may initiate another container (for example, context identifier 1) for the TCP flow or UDP stream and may assign the next available buffer (for example, buffer B) to the container.

In some cases, the modem may fill a buffer assigned to a container when storing data packets in the buffer. This may be referred to as a buffer completion. In this case, the modem may assign the next available buffer to the container and may store data packets of the container in the new buffer. For example, when the modem fills buffer A with data packets of the container associated with context identifier 0, the modem may assign buffer C (for example, because buffer B was already assigned to the container associated with context identifier 1) to the container associated with context identifier 0 and may store data packets in buffer C.

The modem may maintain a log of completion events in an event ring. The event ring may include a data structure or one or more data containers to indicate, to the processor, memory usage of the modem. The event ring may be a common event ring between the first interface channel and the second interface channel. Moreover, the modem may maintain the event ring such that completion events are logged in order in which the completion events occurred. For example, the completion of buffer A (for example, the storage of packet 3 in buffer A) occurred first and is logged first in the event ring, the completion of buffer C (for example, the storage of packet 5 in buffer C) occurred second and is logged second in the event ring, the completion of buffer B (for example, the storage of packet 6 in buffer B) occurred third and is logged third in the event ring, and so on.

A completion event entry in the event ring may include information associated with the completion event. For example, a completion event entry may point to a software cookie associated with the buffer that is associated with the completion event, a context identifier of the container to which the buffer is assigned, or an event type associated with the completion event.

The software cookie associated with a buffer may be stored in a transfer ring associated with the first interface channel (for example, a coalescing transfer ring). The software cookie may include an indication of a buffer address associated with the buffer, such as a virtual address, or a physical address. The processor may transmit an indication of the software cookie associated with the buffer in a coalescing transfer ring element via the coalescing transfer ring, may provide an indication of the buffers that are associated with the first interface channel via the coalescing transfer ring, or may provide an indication of the buffers that are associated with the second interface channel via the non-coalescing transfer ring.

The coalescing transfer ring may be different from the transfer ring associated with the second interface channel (for example, a non-coalescing transfer ring) the first interface channel, and the second interface channel may use the same transfer ring. The transfer rings may include the same data structure or separate data structures, or the same data container or separate data containers, which may store memory addresses, memory lengths, or software cookies associated with data buffers of the first interface channel or the second interface channel.

An event type of a completion event may be based at least in part on a reason that the buffer associated with the completion event was closed. For example, an end of buffer (EOB) event type may indicate that the buffer was closed due to the buffer being filled. As another example, an end of transmission (EOT) event type may indicate that the buffer was closed due to the transfer of data packets into the buffer being terminated. An EOT event type may be triggered by a flag being set in a data packet (for example, a TCP FIN/PUSH flag) that indicates the container (and thus, the buffer), in which the data packet is to be stored, is to be closed. An EOT event type may be triggered by the modem determining that a data packet is not capable of being grouped into a container to which the buffer is assigned.

Figure 5:
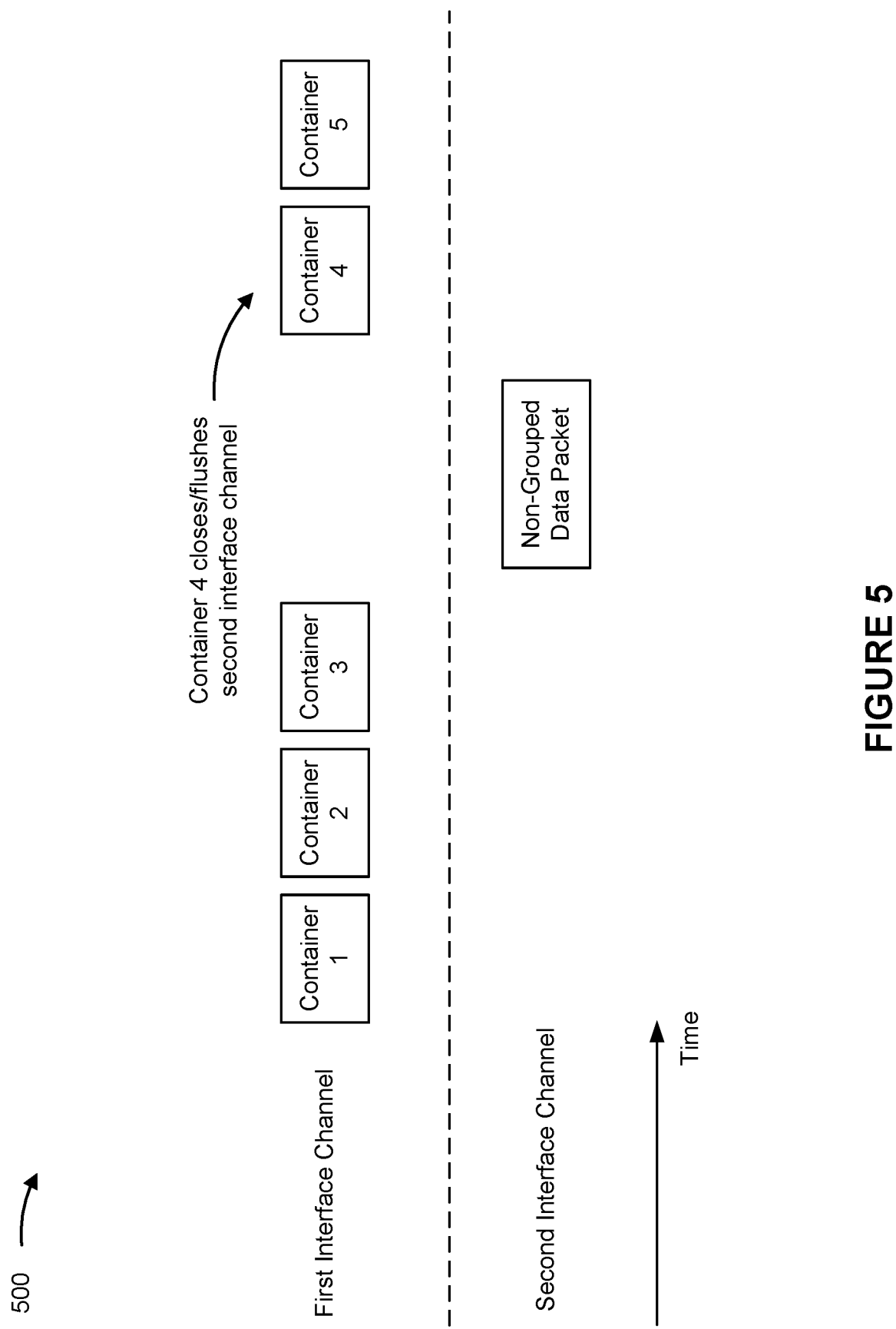

FIG. 5 is a diagram illustrating an example 500 of TCP or UDP receive offloading, in accordance with the present disclosure.

A device (for example, the device described above in connection with FIG. 3 or another device) may receive a plurality of data packets at a modem of the device. The modem may group subsets of the plurality of data packets into a plurality of containers (for example, containers 1 through 5), may transfer the containers to a processor of the device via a first interface channel (for example, a coalescing interface channel), and may transfer a subset of the plurality of data packets (for example, non-grouped or non-coalesced data packets) to the processor via a second interface channel (for example, a non-coalescing interface channel).

The modem may transfer containers 1 through 3 to the processor before transferring a non-grouped or non-coalesced data packet. The modem may transfer containers 4 and 5 after transferring the non-grouped or non-coalesced data packet. To maintain an ordering of buffer completions in an event ring, the modem may close or flush the second interface channel or the buffer assigned to the second interface channel. In this way, the modem may log a completion event for the buffer assigned to the second interface channel between the completion of the buffer associated with container 3 and the completion of the buffer associated with container 4, which may ensure the correct ordering of buffer completions in the event ring.

Figure 6:
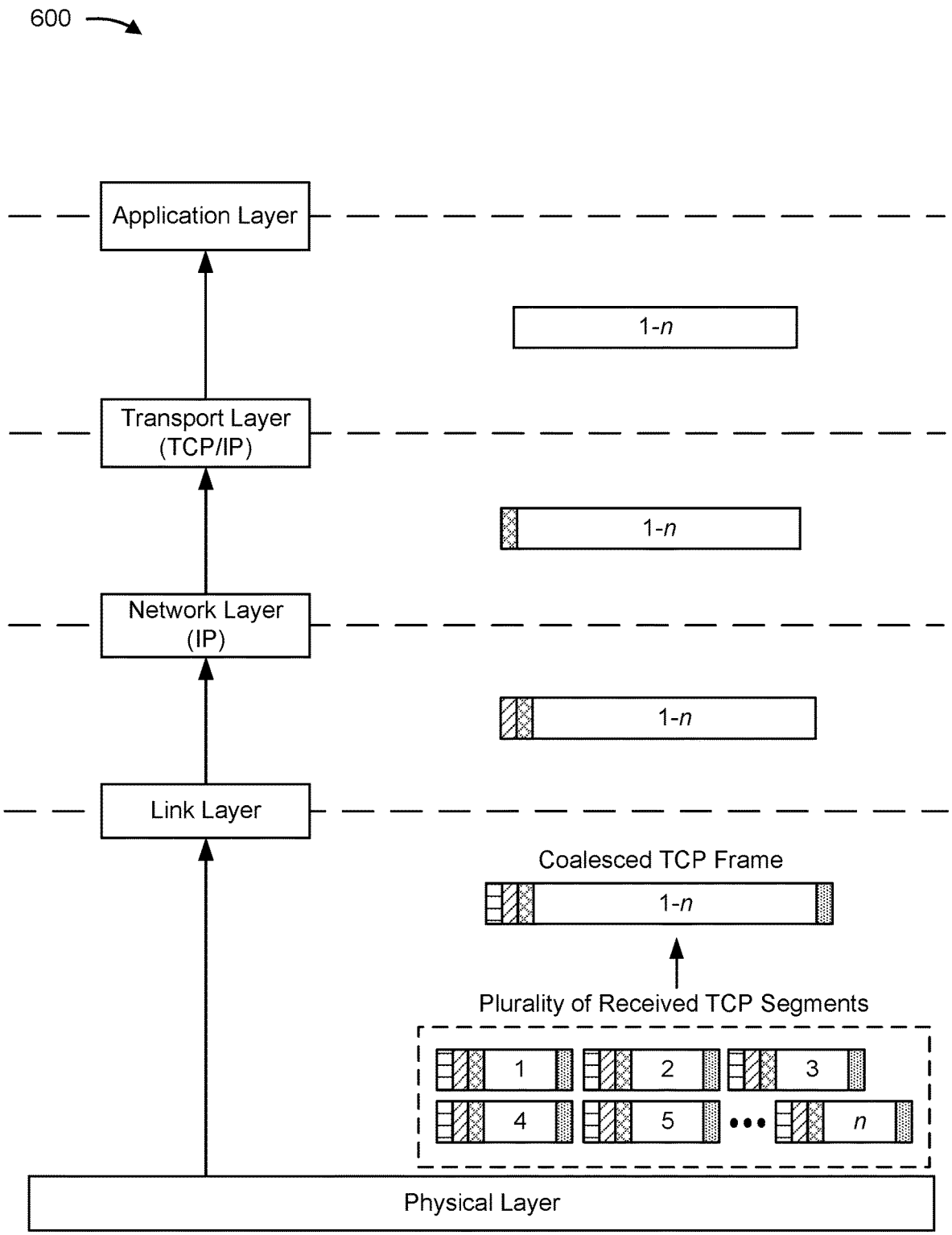
FIG. 6 is a diagram illustrating an example of TCP receive offloading in accordance with the present disclosure.

FIG. 6 is a diagram illustrating an example 600 of TCP receive offloading, in accordance with the present disclosure.

A device (for example, the device described above in connection with FIG. 3 or another device) may receive a plurality of TCP segments (for example, TCP segment 1 through n) at a modem of the device. The modem may group the plurality of TCP segments into a container, such as a coalesced TCP frame, and may transfer the coalesced TCP frame to a processor of the device via a first interface channel (for example, a coalescing interface channel). The modem may group or coalesce the plurality of TCP segments into the coalesced TCP frame by generating a single common coalescing frame header or a common set of network protocol stack headers (for example, by grouping the plurality of TCP segments under the network protocol stack headers of a first TCP segment) and wrapping the coalesced TCP frame in the coalescing frame header, which may reduce the quantity of headers that the processor is to remove or strip from the plurality of TCP segments.

The processor may receive the coalesced TCP frame and may process the coalesced TCP frame through one or more layers of a network protocol stack. For example, the processor may remove or strip one or more link layer headers from the coalesced TCP frame, may remove or strip one or more network layer headers from the coalesced TCP frame, or may remove or strip one or more transport layer headers from the coalesced TCP frame. The processor may provide the remaining payload data to the application layer.

Figure 7:
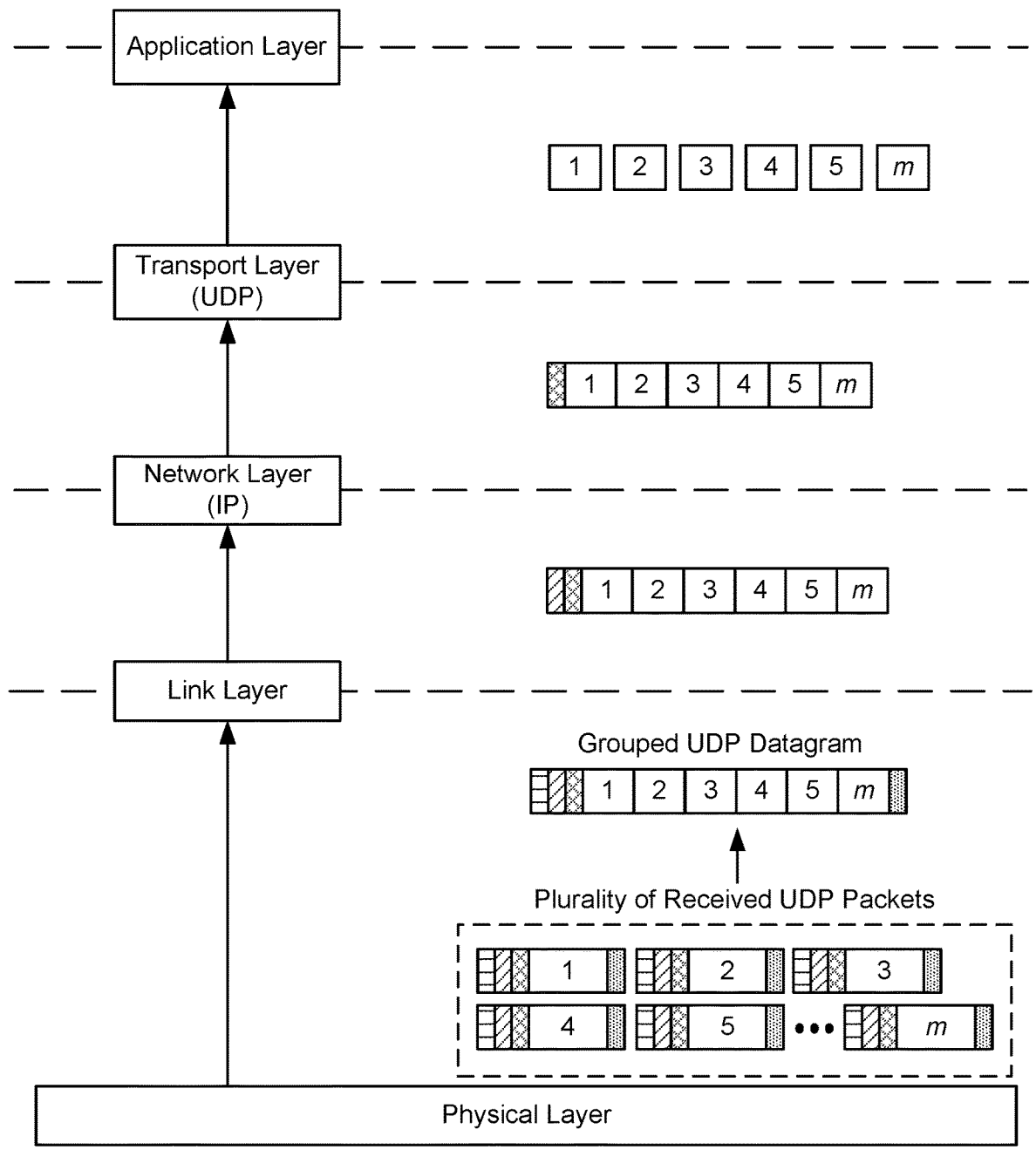
FIG. 7 is a diagram illustrating an example of UDP receive offloading in accordance with the present disclosure.

FIG. 7 is a diagram illustrating an example 700 of UDP receive offloading, in accordance with the present disclosure.

A device (for example, the device described above in connection with FIG. 3 or another device) may receive a plurality of UDP packets (for example, UDP packet 1 through n) at a modem of the device. The modem may group the plurality of UDP packets into a container, such as a grouped UDP datagram, and may transfer the grouped UDP datagram to a processor of the device via a first interface channel (for example, a coalescing interface channel). The modem may group or coalesce the plurality of UDP packets into the grouped UDP datagram by generating a single common grouping UDP header or a common set of network protocol stack headers (for example, by grouping the plurality of UDP packets under the network protocol stack headers of a first UDP packet) and wrapping the grouped UDP datagram in the grouping UDP header, which may reduce the quantity of headers that the processor is to remove or strip from the plurality of UDP packets.

The processor may receive the grouped UDP datagram and may process the grouped UDP datagram through one or more layers of a network protocol stack. For example, the processor may remove or strip one or more link layer headers from the grouped UDP datagram, may remove or strip one or more network layer headers from the grouped UDP datagram, or may remove or strip one or more transport layer headers from the grouped UDP datagram. The processor may provide the remaining payload data to the application layer.

One problem is that the modem may always group a plurality of data packets associated with one or more connections. For each connection, the modem may always group corresponding data packets for transmission to the processor. However, in some cases, grouping data packets may actually deteriorate an operation of the modem or the processor (for example, under used buffers or dropped data packets). Some data packets may be better suited to not be grouped together, but the modem may be unable to differentiate which data packets that should be grouped together versus which data packets should not be grouped together.

Various aspects relate generally to grouping (or coalescing) data packets into a container based at least in part on one or more characteristics associated with a modem or the data packets. The modem may be responsible for grouping the data packets, and for transmitting grouped data packets to a processor. The modem and the processor may both be included in a device, such as a UE, a base station, or a network controller. Some aspects more specifically relate to determining, in a dynamic manner, whether or not to group the data packets based at least in part on the one or more characteristics associated with the modem or the data packets. The one or more characteristics may be related to a buffer efficiency of a buffer associated with the modem, a quantity of active connections associated with the modem, a traffic pattern of the data packets, a context identifier associated with a connection for which the data packets are received, Internet Protocol identifiers associated with the data packets, checksum errors associated with the data packets, sizes of headers associated with the data packets, or a presence of special flags in the data packets.

Particular aspects of the subject matter described in this disclosure can be implemented to realize one or more of the following potential advantages. In some examples, the described techniques can be used to improve an operation of the modem or the processor in the device. The operation of the modem or the processor may be improved when only data packets that are well suited for grouping are grouped together, and when data packets that are not well suited for grouping are not grouped together. As a result, the modem may not group data packets and the processor may not process data packets that should not be combined together, which may result in a higher throughput due to a higher buffer efficiency at the modem and a reduced quantity of dropped data packets (for example, data packets that are not received at the processor).

Figure 8:
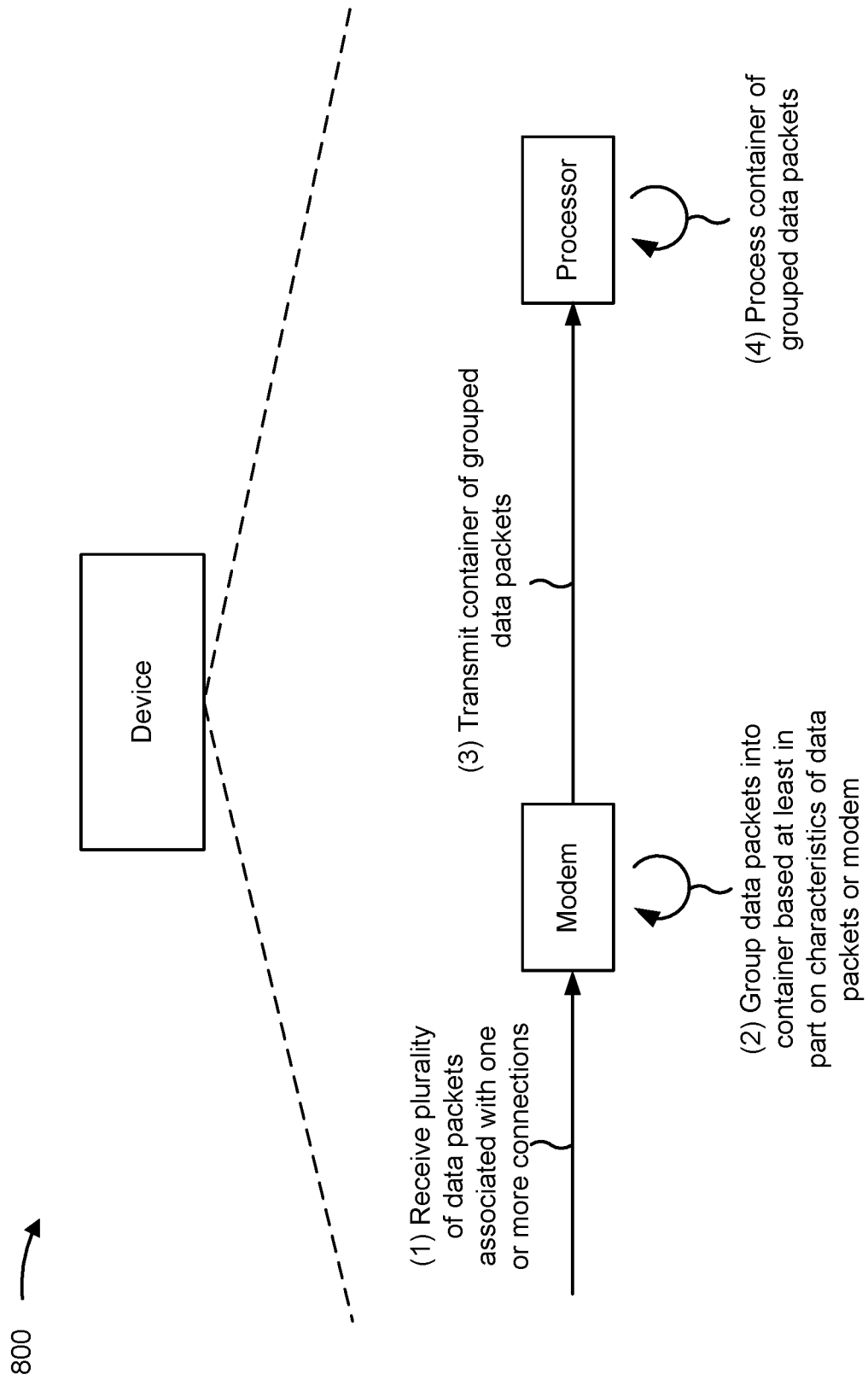
FIG. 8 is a diagram illustrating an example associated with grouping data packets at a modem in accordance with the present disclosure.

FIG. 8 is a diagram illustrating an example 800 associated with grouping data packets at a modem, in accordance with the present disclosure. As shown in FIG. 8, example 800 may include communication or processing of data packets by a device (for example, a UE 120, a base station 110, or a network controller 130). The modem may be included in the device or may be communicatively connected to the device. The processor may be a host processor or an application processor.

In a first operation, the modem may receive a plurality of data packets associated with one or more connections. A connection, of the one or more connections, may be a TCP connection or a UDP connection. A data packet, of the plurality of data packets, may be a TCP packet or a UDP packet. The modem may receive the plurality of data packets via a wireless network. The first operation may correspond to the first operation described with respect to FIG. 3.

In a second operation, the modem may group data packets, of the plurality of data packets, associated with a connection, of the one or more connections, into a container based at least in part on one or more characteristics associated with the modem or the data packets. The grouping (or coalescing) of the data packets may be referred to as RSC. The one or more characteristics may relate to a buffer efficiency of a buffer associated with the modem, a quantity of active connections associated with the modem, a traffic pattern of the data packets received at the modem, context identifiers associated with connections for which the data packets are received, IP identifiers associated with the data packets, checksum errors associated with the data packets, sizes of headers associated with the data packets, or a presence of a special flag (for example, a FIN/PUSH flag) in the data packets.

In some aspects, the processor may determine, based at least in part on the one or more characteristics, that a buffer efficiency of a buffer associated with the connection does not satisfy a threshold. The processor may transmit, to the modem, based at least in part on the buffer efficiency not satisfying the threshold, an indication that subsequent data packets associated with the connection are to not be grouped by the modem into any containers. In some aspects, "buffer efficiency" may correspond to a quantity of bytes written to a buffer, for a plurality of data packets associated with a specific connection, divided by a size of the buffer. In other words, the "buffer efficiency" may refer to a size of a grouped/coalesced frame divided by a full size of the buffer.

In some aspects, the modem may use the buffer for an ordering of data packets. A context may be associated with a context identifier, where the context identifier may be associated with a container to which the buffer is assigned.

When a quantity of connections is more than a quantity of contexts that are supported, contexts may be used in a least recently used (LRU) manner. As an example, ten connections may be active and four contexts may be available. When connection 5 comes in and all four contexts are already being used, one connection may be preempted. For example, connection 1 may have come first, which may be followed by connection 2, connection 3, and connection 4. If connection 1 has not received data packets more recently than connection 2, connection 3, or connection 4, then connection 5 may preempt connection 1. A grouping of data packets may involve using the contexts in the LRU manner, which may reduce pauses or breaks in operation.

In some cases, connection 1 may be infrequent and may be preempted multiple times over a period of a data transfer, but connection 1 may not be infrequent enough to not cause a buffer efficiency problem. As an example, the buffer may be a 64 kB buffer. The modem, since connection 1 is infrequent, may use the entire 64 kB buffer for just one or two data packets. As an example, the processor may determine that, in the 64 kB buffer, only 3 kB of actual data may be received and the remaining 61 kB of that buffer may be unused. The buffer efficiency may not satisfy a threshold (for example, 10-20% per connection), which may indicate that the connection is infrequent but still uses the buffer. In this case, the processor may request the modem to not perform grouping for connection 1. In other words, the processor may dynamically disable RSC based at least in part on the buffer efficiency. The processor may determine to disable RSC when the buffer efficiency for certain connections do not satisfy the threshold. As a result, the buffer may be used more by other active connections. In some aspects, the processor may dynamically disable RSC based at least in part on a processor utilization and/or memory utilization. In other words, RSC may be disabled based at least in part on changing factors at the processor.

In some aspects, the processor may indicate to the modem a whitelist (or allowable list), which may indicate connections for which RSC is allowed. Alternatively, the processor may indicate to the modem a blacklist (or not allowable list), which may indicate connections for which RSC is not allowed. Depending on the whitelist or blacklist, the modem may perform or not perform grouping of data packets associated with certain connections accordingly.

In some aspects, the processor may determine, based at least in part on the one or more characteristics, that a quantity of connections associated with the modem satisfies a threshold. The processor may transmit, to the modem, based at least in part on the quantity of connections satisfying the threshold, an indication that subsequent data packets associated with the connection are to not be grouped by the modem into any containers.

In some aspects, the processor may disable RSC based at least in part on the quantity of connections. When the quantity of connections is relatively large compared to the quantity of contexts that are available, and many of those connections are using a bandwidth somewhat equally which allows each connection to only have a few data packets per transmission time interval, the processor may determine to temporarily disable RSC for all of the connections or for a subset of the connections.

In some aspects, the processor may determine, based at least in part on the one or more characteristics, traffic patterns between the one or more connections associated with the modem. The processor may transmit, to the modem, based at least in part on the traffic patterns between the one or more connections, an indication that subsequent data packets associated with the connection are to not be grouped by the modem into any containers.

In some aspects, the processor may disable RSC based at least in part on the traffic patterns. The processor may detect the traffic patterns between the connections. The processor may send, to the modem, a whitelist or a blacklist of connections that are permitted or not permitted, respectively, to have RSC.

In some aspects, the processor may associate, based at least in part on the one or more characteristics, the connection with a context identifier. The context identifier may be associated with a context included in a plurality of contexts, and other contexts included in the plurality of contexts may be interchangeable between other active connections associated with the modem. The processor may transmit, to the modem, an indication that the connection is associated with the context identifier.

In some aspects, to prevent new connections from preempting older connections, the processor may determine that certain connections should always use RSC. For example, the processor may determine to have connection 1 use RSC (for example, connection 1 may be made sticky to context 1). Other contexts, such as context 2, context 3, and context 4 may be free-floating and may be used for other active connections. The processor may determine to enable RSC for only a few connections based at least in part on throughputs associated with the connections. The processor may indicate to the modem that a certain connection is to be only processed using a given context. In some cases, some of the contexts may not be allowed for RSC. In other words, some contexts may be "stuck" to certain connections, some contexts may be useable for a plurality of active connections, and some contexts may not be used for RSC.

In some aspects, the plurality of contexts may be partitioned between different protocol types associated with connections, reservations, traffic entities, or packet data network levels. The plurality of contexts may be partitioned based at least in part on a static configuration or a dynamic configuration.

In some aspects, RSC pipes (or channel interfaces for which data packets are combined) may be portioned between the different protocol types, reservations, traffic entities, or packet data network levels.

In some aspects, the different protocol types may be UDP or TCP. As an example, TCP may use certain contexts while UDP may use certain contexts. The reservations may be Ethernet or IP. The traffic entities may be V2X, tethered, WAN, or LAN. As an example, a WAN may use certain contexts while a LAN may use certain contexts. The packet data network levels may be associated with IP multimedia subsystem (IMS), Internet, low latency messaging (LLM), or V2X. In some aspects, the dynamic configuration may be based at least in part on a current traffic pattern, or the dynamic configuration may be based at least in part on a machine learning of historical traffic patterns.

In some aspects, the different protocols types may be associated with an unstructured protocol data unit (PDU) session type. For a PDU session established with the unstructured PDU session type, PDUs may be treated as unstructured bits which may be coalesceable.

In some aspects, the modem may determine, based at least in part on the one or more characteristics, whether the grouped data packets are associated with incremental IP identifiers. The modem may transmit, to the processor, an indication that indicates whether the grouped data packets are associated with the incremental IP identifiers. The processor may perform a re-segmentation of the data packets based at least in part on the indication.

In some aspects, IP identifiers associated with the data packets may not necessarily be sequential or incremental in value in order for the data packets to be grouped. In other words, a dependency of the IP identifiers being sequential or incremental in value may be removed. Data packets that are associated with randomly changing IP identifiers may be combined. The IP identifiers may be ignored from an RSC perspective to increase an RSC efficiency. In some aspects, the modem may send an indication to the processor, where the indication may indicate whether incoming data packets have a pattern of incremental IP identifiers, static or fixed IP identifiers, or random IP identifiers. The indication may enable the processor to perform a re-segmentation of combined data packets. The re-segmentation may be needed when the combined data packets received at the processor from the modem are to be forwarded to other tethered interconnects, such as USB, wireless local area network (WLAN), or Ethernet, and associated hosts may not support RSC. As an example, if the processor receives ten data packets as one combined data packet with an IP identifier of N, the processor may segment the combined data packets to form ten segmented data packets with IP identifiers of N+1, N+2, ... N+9, and segmented data packets may be provided to a destination, such as the other tethered interconnects. Alternatively, each of the ten segmented data packets may be associated with a static or fixed IP identifier. The destination may not consume the segmented data packets and may instead forward the segmented data packets to another destination.

In some aspects, the modem may determine, based at least in part on the one or more characteristics, that the container includes a data packet associated with a checksum error. The modem may transmit, to the processor, the container that includes the data packet associated with the checksum error. The processor may remove or resolve the data packet associated with the checksum error included in the container. Alternatively, the modem may transmit, to the processor, the data packet associated with the checksum error separately from the container, where the container may exclude the data packet associated with the checksum error.

In some aspects, in a checksum failure scenario, a data packet that may have a checksum error may be combined with an already coalesced frame (or container). As an example, the coalesced frame may have five data packets, and the modem may determine that an incorrect checksum is associated with a sixth data packet. The incorrect checksum may result from a calculated checksum for the sixth packet not matching a checksum indicated in a header of the sixth data packet. The sixth packet may be included in the coalesced frame. In other words, checksum error data may be written along with the coalesced frame. Further, the modem may indicate to the processor that this coalesced frame contains sixth data packets, and that the sixth data packet starting at a certain offset is associated with the incorrect checksum. The incorrect checksum may be indicated via a bitmap in the coalesced frame. The processor may determine whether to remove the sixth data packet from the coalesced frame and process only the five data packets, or the processor may determine whether to recover the checksum associated with the sixth data packet. Alternatively, the modem may transmit the sixth packet as a separate payload to the processor. In this case, the coalesced frame may only include the five data packets having checksums without errors. The sixth data packet may not be combined with the coalesced frame. The processor may process the sixth data packet with the incorrect checksum individually. In other words, a data packet associated with a checksum failure may be combined with an existing coalesced frame, or the data packet associated with the checksum failure may be delivered as a separate frame with a checksum failure indication. In some aspects, the data packet associated with the checksum failure may not be combined with the coalesced frame and may be transmitted from the modem to the processor via a default pipe (or a channel interface for which data packets are not combined) as an IP failed packet.

In some aspects, the modem may group, based at least in part on the one or more characteristics, the data packets associated with the connection into the container based at least in part on a communication of data packets with another device via a LAN. In some aspects, in a LAN-to-LAN coalescing, RSC may be used for non-WWAN (wireless wide area network) cases when two or more LAN clients communicate through a chipset. One or more clients or hosts (or processors) may benefit from coalescing data packets to reduce a quantity of transfers.

In some aspects, the modem may determine, based at least in part on the one or more characteristics, that one or more sizes of one or more headers associated with subsequent data packets satisfies a threshold. The modem may determine, based at least in part on the one or more sizes of the one or more headers satisfying the threshold, to not group the subsequent data packets into any containers.

In some aspects, the modem may determine to not use RSC for data packets with data packet headers having sizes that are above a certain range. For example, an IP header may have a plurality of "options" fields or an Ethernet header may include various tags which are added for protocol purposes, which may result in such headers having sizes that are above the certain range. In this case, the modem may not apply RSC to these data packets. Instead, the processor may be configured to specially process each of these data packets individually.

In some aspects, the modem may determine, based at least in part on the one or more characteristics, that a data packet associated with the connection indicates a special flag. The modem may group the data packet indicating the special flag with the data packets associated with the connection into the container. Alternatively, the modem may transmit, to the processor, based at least in part on the container not being available, the data packet outside of the container. As an example, the special flag may be a FIN flag, which may be indicated to close a connection. As another example, the special flag may be a PUSH flag, which may indicate that the data packet should be pushed to the processor in a relatively short period of time.

In some aspects, the modem may receive a data packet from a network with a FIN/PUSH (or TCP FIN/PUSH), where the data packet may be associated with a connection. When a coalescing frame is already open for that connection, the data packet with the FIN/PUSH may be coalesced with the coalescing frame and get pushed to the processor. A FIN/PUSH flag may be set in a top level header of the data packet. When there is no coalescing frame open for that connection, a new coalescing frame for the data packet with the FIN/PUSH may not be created. Rather, the modem may send the data packet with the FIN/PUSH via a default pipe (or channel interface), such that the processor may obtain the data packet in a shorter period of time as compared to creating the new coalescing frame for the data packet with the FIN/PUSH.

In some aspects, specialized data packets (for example, TCP FIN/PUSH) may be transmitted on different pipes with an in-order delivery maintained. For example, one frame may be for regular data packets and another frame may be for the specialized data packet, and on different pipes. Alternatively, the specialized data packets may be transmitted on a same pipe with a coalescing in-order delivery maintained. For example, one frame may be for regular packets and specialized packets coalesced together with an appropriate indication, which may decrease a total quantity of frames and increase a buffer efficiency.

In some aspects, a single event ring between the processor and the modem may provide an in-order delivery of the data packets between the modem and the processor, irrespective of whether the data packets are grouped and transmitted via a first channel interface or whether the data packets are not grouped and transmitted via a second channel interface. In some aspects, the modem and the processor may negotiate one or more parameters associated with the grouping of the data packets associated with the container, where the one or more parameters may include a maximum container size and a timer value for grouping the data packets.

In some aspects, the single event ring between the processor and the modem may ensure that packet in-order delivery is maintained, irrespective of a pipe (or channel interface) used to transfer the data packets. The processor may determine whether a consumed data packet is from an RSC pipe or a default pipe, and an order in which the data packets are to be consumed, which may be provided by the single event ring. Further, the processor and the modem may negotiate or configure a maximum coalescing frame size, coalescing timers, or special events. As an example, the maximum coalescing frame size may be 16 kB or 64 kB. A coalescing timer may indicate that the modem is to perform RSC on data packets for up to N milliseconds.

In some aspects, the processor may associate, based at least in part on the one or more characteristics, a context identifier with the connection, where the context identifier may be associated with a context included in a plurality of contexts. The processor may transmit, to the modem, an indication that the context identifier is associated to the connection.

In some aspects, multiple simultaneous contexts (or coalescing contexts) may be supported. The processor may configure some connections to be associated with (or sticky to) a particular context, which may allow a maximum coalescing in scenarios where a quantity of connections is greater than a quantity of available contexts. In other words, the processor may make some connections sticky to some contexts, while other contexts may be free floating to support other active connections.

In a third operation, the modem may transmit to the processor the container of grouped data packets. The third operation may correspond to the third and fourth operations described with respect to FIG. 3.

In a fourth operation, the processor may process the container of grouped data packets. For example, the processor may extract information from the container, and provide the information to an application executing on the device. The fourth operation may correspond to the fifth operation described with respect to FIG. 3.

Figure 9:
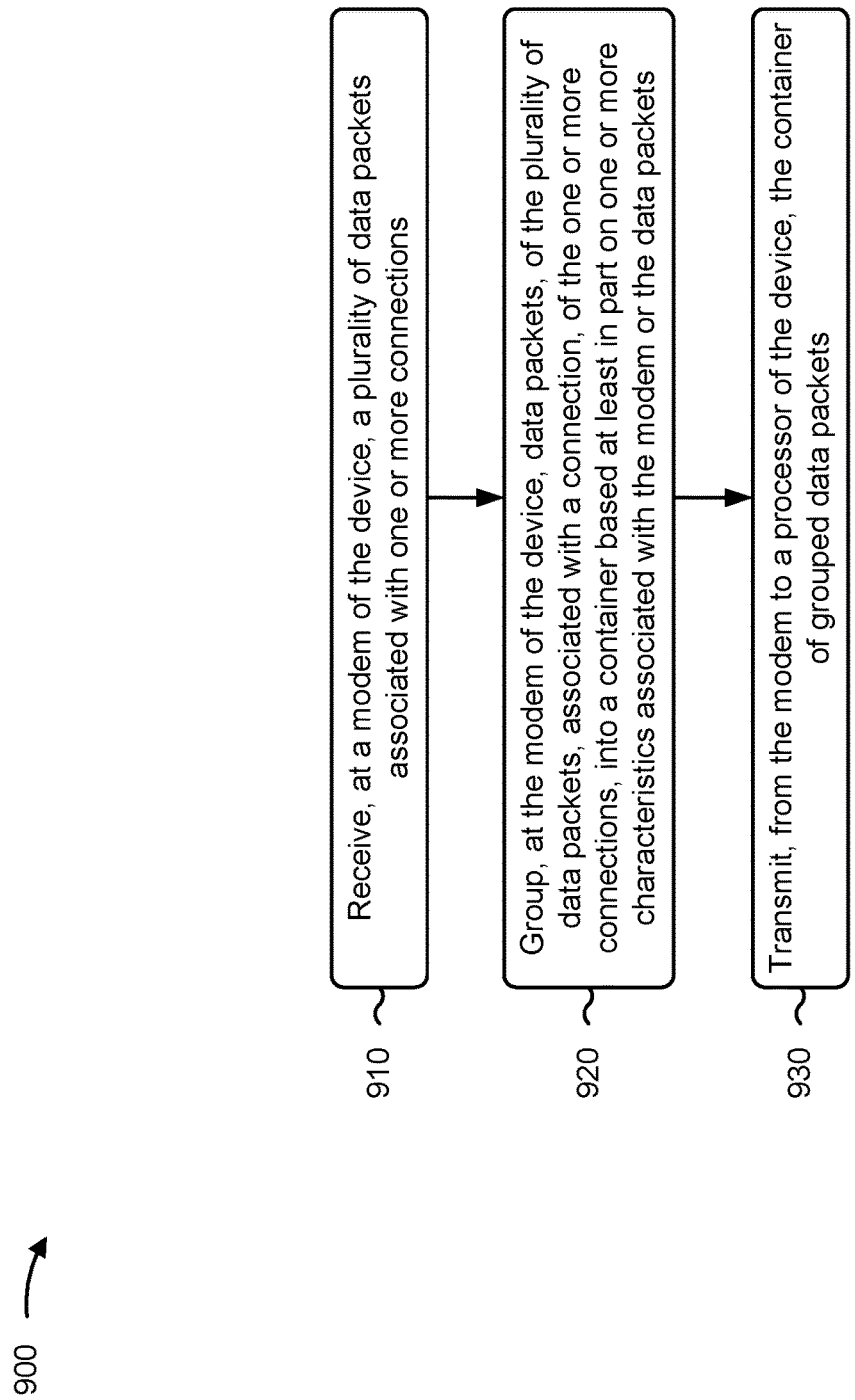
FIG. 9 is a flowchart illustrating an example process performed, for example, by a device in accordance with the present disclosure.

FIG. 9 is a flowchart illustrating an example process 900 performed, for example, by a device in accordance with the present disclosure. Example process 900 is an example where the device (for example, base station 110, UE 120, or network controller 130) performs operations associated with grouping data packets at a modem.

As shown in FIG. 9, in some aspects, process 900 may include receiving, at a modem of the device, a plurality of data packets associated with one or more connections (block 910). For example, the device (such as by using communication manager 140 or reception component 1002, depicted in FIG. 10) may receive, at a modem of the device, a plurality of data packets associated with one or more connections, as described above.

As further shown in FIG. 9, in some aspects, process 900 may include grouping, at the modem of the device, data packets, of the plurality of data packets, associated with a connection, of the one or more connections, into a container based at least in part on one or more characteristics associated with the modem or the data packets (block 920). For example, the device (such as by using communication manager 140 or reception component 1002, depicted in FIG. 10) may group, at the modem of the device, data packets, of the plurality of data packets, associated with a connection, of the one or more connections, into a container based at least in part on one or more characteristics associated with the modem or the data packets, as described above.

As further shown in FIG. 9, in some aspects, process 900 may include transmitting, from the modem to a processor of the device, the container of grouped data packets (block 930). For example, the device (such as by using communication manager 140 or reception component 1002, depicted in FIG. 10) may transmit, from the modem to a processor of the device, the container of grouped data packets, as described above.

Process 900 may include additional aspects, such as any single aspect or any combination of aspects described below or in connection with one or more other processes described elsewhere herein.

In a first additional aspect, process 900 includes determining, at the processor, based at least in part on the one or more characteristics, that a buffer efficiency of a buffer associated with the connection does not satisfy a threshold; and transmitting, from the processor to the modem, based at least in part on the buffer efficiency not satisfying the threshold, an indication that subsequent data packets associated with the connection are to not be grouped by the modem into any containers.

In a second additional aspect, alone or in combination with the first aspect, process 900 includes determining, at the processor, based at least in part on the one or more characteristics, that a quantity of connections associated with the modem satisfies a threshold; and transmitting, from the processor to the modem, based at least in part on the quantity of connections satisfying the threshold, an indication that subsequent data packets associated with the connection are to not be grouped by the modem into any containers.

In a third additional aspect, alone or in combination with one or more of the first and second aspects, process 900 includes determining, at the processor, based at least in part on the one or more characteristics, traffic patterns between the one or more connections associated with the modem; and transmitting, from the processor to the modem, based at least in part on the traffic patterns between the one or more connections, an indication that subsequent data packets associated with the connection are to not be grouped by the modem into any containers.

In a fourth additional aspect, alone or in combination with one or more of the first through third aspects, process 900 includes associating, at the processor, based at least in part on the one or more characteristics, the connection with a context identifier, wherein the context identifier is associated with a context included in a plurality of contexts, and other contexts included in the plurality of contexts are interchangeable between other active connections associated with the modem; and transmitting, from the processor to the modem, an indication that the connection is associated with the context identifier.

In a fifth additional aspect, alone or in combination with one or more of the first through fourth aspects, the plurality of contexts are partitioned between different protocol types associated with connections, reservations, traffic entities, or packet data network levels, and the plurality of contexts are partitioned based at least in part on a static configuration or a dynamic configuration.

In a sixth additional aspect, alone or in combination with one or more of the first through fifth aspects, process 900 includes determining, at the modem, based at least in part on the one or more characteristics, whether the grouped data packets are associated with incremental IP identifiers; transmitting, from the modem to the processor, an indication that indicates whether the grouped data packets are associated with the incremental IP identifiers; and performing, at the processor, a re-segmentation of the data packets based at least in part on the indication.

In a seventh additional aspect, alone or in combination with one or more of the first through sixth aspects, process 900 includes determining, at the modem, based at least in part on the one or more characteristics, that the container transmitted to the processor includes a data packet associated with a checksum error; and removing or resolving, at the processor, the data packet associated with the checksum error included in the container.

In an eighth additional aspect, alone or in combination with one or more of the first through seventh aspects, process 900 includes determining, at the modem, based at least in part on the one or more characteristics, that the container includes a data packet associated with a checksum error; and transmitting, from the modem to the processor, the data packet associated with the checksum error separately from the container, wherein the container excludes the data packet associated with the checksum error.

In a ninth additional aspect, alone or in combination with one or more of the first through eighth aspects, grouping, at the modem of the device, based at least in part on the one or more characteristics, the data packets associated with the connection into the container is based at least in part on a communication of data packets with another device via a LAN.

In a tenth additional aspect, alone or in combination with one or more of the first through ninth aspects, process 900 includes determining, at the modem, based at least in part on the one or more characteristics, that one or more sizes of one or more headers associated with subsequent data packets satisfies a threshold; and determining, at the modem, based at least in part on the one or more sizes of the one or more headers satisfying the threshold, to not group the subsequent data packets into any containers.

In an eleventh additional aspect, alone or in combination with one or more of the first through tenth aspects, process 900 includes determining, at the modem based at least in part on the one or more characteristics, that a data packet associated with the connection indicates a special flag; and grouping the data packet indicating the special flag with the data packets associated with the connection into the container.

In a twelfth additional aspect, alone or in combination with one or more of the first through eleventh aspects, process 900 includes determining, at the modem based at least in part on the one or more characteristics, that a data packet associated with the connection indicates a special flag; and transmitting, from the modem to the processor, based at least in part on the container not being available, the data packet outside of the container.

In a thirteenth additional aspect, alone or in combination with one or more of the first through twelfth aspects, a single event ring between the processor and the modem provides an in-order delivery of the data packets between the modem and the processor, irrespective of whether the data packets are grouped and transmitted via a first channel interface or whether the data packets are not grouped and transmitted via a second channel interface.

In a fourteenth additional aspect, alone or in combination with one or more of the first through thirteenth aspects, process 900 includes negotiating, between the modem and the processor, one or more parameters associated with the grouping of the data packets associated with the container, wherein the one or more parameters include a maximum container size and a timer value for grouping the data packets.

In a fifteenth additional aspect, alone or in combination with one or more of the first through fourteenth aspects, the one or more characteristics associated with the modem or the data packets are related to one or more of: a buffer efficiency of a buffer associated with the modem, a quantity of active connections associated with the modem, a traffic pattern of the plurality of data packets received at the modem, context identifiers associated with the one or more connections for which the plurality of data packets are received, Internet Protocol identifiers associated with the plurality of data packets, checksum errors associated with the plurality of data packets, sizes of headers associated with the plurality of data packets, or a presence of special flags in the plurality of data packets.

In a sixteenth additional aspect, alone or in combination with one or more of the first through fifteenth aspects, the connection is a TCP connection or a UDP connection and the data packets are TCP packets or UDP packets, respectively.

Although FIG. 9 shows example blocks of process 900, in some aspects, process 900 may include additional blocks, fewer blocks, different blocks, or differently arranged blocks than those depicted in FIG. 9. Additionally or alternatively, two or more of the blocks of process 900 may be performed in parallel.

Figure 10:
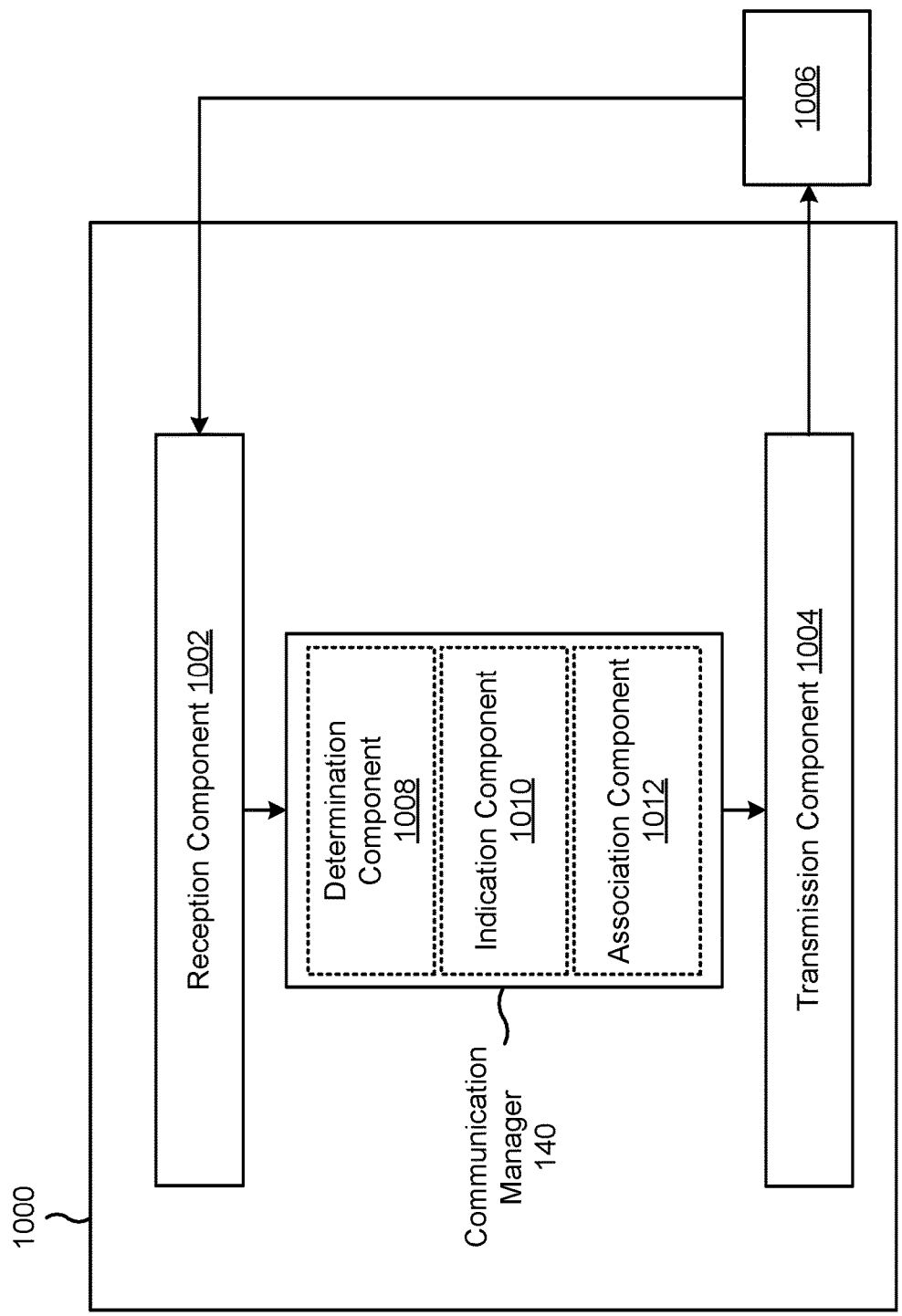
FIG. 10 is a diagram of an example apparatus for wireless communication in accordance with the present disclosure.

FIG. 10 is a diagram of an example apparatus 1000 for wireless communication in accordance with the present disclosure. The apparatus 1000 may be a device, or a device may include the apparatus 1000. In some aspects, the apparatus 1000 includes a reception component 1002, a transmission component 1004, and a communication manager 140, which may be in communication with one another (for example, via one or more buses). As shown, the apparatus 1000 may communicate with another apparatus 1006 (such as a UE, a base station, or another wireless communication device) using the reception component 1002 and the transmission component 1004.

In some aspects, the apparatus 1000 may be configured to perform one or more operations described herein in connection with FIG. 8. Additionally or alternatively, the apparatus 1000 may be configured to perform one or more processes described herein, such as process 900 of FIG. 9. In some aspects, the apparatus 1000 may include one or more components of the device described above in connection with FIG. 2.

The reception component 1002 may receive communications, such as reference signals, control information, data communications, or a combination thereof, from the apparatus 1006. The reception component 1002 may provide received communications to one or more other components of the apparatus 1000, such as the communication manager 140. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1002 may include one or more antennas, a modem, a demodulator, a MIMO detector, a receive processor, a controller/processor, a memory, or a combination thereof, of the device described above in connection with FIG. 2.

The transmission component 1004 may transmit communications, such as reference signals, control information, data communications, or a combination thereof, to the apparatus 1006. In some aspects, the communication manager 140 may generate communications and may transmit the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the device described above in connection with FIG. 2. In some aspects, the transmission component 1004 may be co-located with the reception component 1002 in a transceiver.

The communication manager 140 may include a controller/processor, a memory, a scheduler, a communication unit, or a combination thereof, of the device described above in connection with FIG. 2. In some aspects, the communication manager 140 includes a set of components, such as a determination component 1008, an indication component 1010, an association component 1012, or a combination thereof. Alternatively, the set of components may be separate and distinct from the communication manager 140. In some aspects, one or more components of the set of components may include or may be implemented within a controller/processor, a memory, a scheduler, a communication unit, or a combination thereof, of the device described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive, at a modem of the device, a plurality of data packets associated with one or more connections. The reception component 1002 may group, at the modem of the device, data packets, of the plurality of data packets, associated with a connection, of the one or more connections, into a container based at least in part on one or more characteristics associated with the modem or the data packets. The reception component 1002 may transmit, from the modem to a processor of the device, the container of grouped data packets.

The determination component 1008 may determine, at the processor, based at least in part on the one or more characteristics, that a buffer efficiency of a buffer associated with the connection does not satisfy a threshold. The indication component 1010 may transmit, from the processor to the modem, based at least in part on the buffer efficiency not satisfying the threshold, an indication that subsequent data packets associated with the connection are to not be grouped by the modem into any containers.

The determination component 1008 may determine, at the processor, based at least in part on the one or more characteristics, that a quantity of connections associated with the modem satisfies a threshold. The indication component 1010 may transmit, from the processor to the modem, based at least in part on the quantity of connections satisfying the threshold, an indication that subsequent data packets associated with the connection are to not be grouped by the modem into any containers.

The determination component 1008 may determine, at the processor, based at least in part on the one or more characteristics, traffic patterns between the one or more connections associated with the modem. The indication component 1010 may transmit, from the processor to the modem, based at least in part on the traffic patterns between the one or more connections, an indication that subsequent data packets associated with the connection are to not be grouped by the modem into any containers.

The association component 1012 may associate, at the processor, based at least in part on the one or more characteristics, the connection with a context identifier, wherein the context identifier is associated with a context included in a plurality of contexts, and other contexts included in the plurality of contexts are interchangeable between other active connections associated with the modem. The indication component 1010 may transmit, from the processor to the modem, an indication that the connection is associated with the context identifier.

The determination component 1008 may determine, at the modem, based at least in part on the one or more characteristics, whether the grouped data packets are associated with incremental IP identifiers. The indication component 1010 may transmit, from the modem to the processor, an indication that indicates whether the grouped data packets are associated with the incremental IP identifiers.

The reception component 1002 may determine, at the modem, based at least in part on the one or more characteristics, that the container includes a data packet associated with a checksum error. The reception component 1002 may transmit, from the modem to the processor, the container that includes the data packet associated with the checksum error.

The reception component 1002 may determine, at the modem, based at least in part on the one or more characteristics, that the container includes a data packet associated with a checksum error. The reception component 1002 may transmit, from the modem to the processor, the data packet associated with the checksum error separately from the container, wherein the container excludes the data packet associated with the checksum error.

The reception component 1002 may determine, at the modem, based at least in part on the one or more characteristics, that one or more sizes of one or more headers associated with subsequent data packets satisfies a threshold. The reception component 1002 may determine, at the modem, based at least in part on the one or more sizes of the one or more headers satisfying the threshold, to not group the subsequent data packets into any containers. The reception component 1002 may determine, at the modem based at least in part on the one or more characteristics, that a data packet associated with the connection indicates a special flag. The reception component 1002 may group the data packet indicating the special flag with the data packets associated with the connection into the container. The reception component 1002 may determine, at the modem based at least in part on the one or more characteristics, that a data packet associated with the connection indicates a special flag. The reception component 1002 may transmit processor, based at least in part on the container not being available, the data packet outside of the container.

The association component 1012 may associate, at the processor, based at least in part on the one or more characteristics, a context identifier to the connection, wherein the context identifier is associated with a context included in a plurality of contexts. The indication component 1010 may transmit, from the processor to the modem, an indication that the context identifier is associated to the connection.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a device, comprising: receiving, at a modem of the device, a plurality of data packets associated with one or more connections; grouping, at the modem of the device, data packets, of the plurality of data packets, associated with a connection, of the one or more connections, into a container based at least in part on one or more characteristics associated with the modem or the data packets; and transmitting, from the modem to a processor of the device, the container of grouped data packets.

Aspect 2: The method of Aspect 1, further comprising: determining, at the processor, based at least in part on the one or more characteristics, that a buffer efficiency of a buffer associated with the connection does not satisfy a threshold; and transmitting, from the processor to the modem, based at least in part on the buffer efficiency not satisfying the threshold, an indication that subsequent data packets associated with the connection are to not be grouped by the modem into any containers.

Aspect 3: The method of any of Aspects 1 through 2, further comprising: determining, at the processor, based at least in part on the one or more characteristics, that a quantity of connections associated with the modem satisfies a threshold; and transmitting, from the processor to the modem, based at least in part on the quantity of connections satisfying the threshold, an indication that subsequent data packets associated with the connection are to not be grouped by the modem into any containers.

Aspect 4: The method of any of Aspects 1 through 3, further comprising: determining, at the processor, based at least in part on the one or more characteristics, traffic patterns between the one or more connections associated with the modem; and transmitting, from the processor to the modem, based at least in part on the traffic patterns between the one or more connections, an indication that subsequent data packets associated with the connection are to not be grouped by the modem into any containers.

Aspect 5: The method of any of Aspects 1 through 4, further comprising: associating, at the processor, based at least in part on the one or more characteristics, the connection with a context identifier, wherein the context identifier is associated with a context included in a plurality of contexts, and wherein other contexts included in the plurality of contexts are interchangeable between other active connections associated with the modem; and transmitting, from the processor to the modem, an indication that the connection is associated with the context identifier.

Aspect 6: The method of Aspect 5, wherein the plurality of contexts are partitioned between different protocol types associated with connections, reservations, traffic entities, or packet data network levels, and wherein the plurality of contexts are partitioned based at least in part on a static configuration or a dynamic configuration.

Aspect 7: The method of any of Aspects 1 through 6, further comprising: determining, at the modem, based at least in part on the one or more characteristics, whether the grouped data packets are associated with incremental Internet Protocol (IP) identifiers; transmitting, from the modem to the processor, an indication that indicates whether the grouped data packets are associated with the incremental IP identifiers; and performing, at the processor, a re-segmentation of the data packets based at least in part on the indication.

Aspect 8: The method of any of Aspects 1 through 7, further comprising: determining, at the modem, based at least in part on the one or more characteristics, that the container includes a data packet associated with a checksum error; and removing or resolving, at the processor, the data packet associated with the checksum error included in the container.

Aspect 9: The method of any of Aspects 1 through 8, further comprising: determining, at the modem, based at least in part on the one or more characteristics, that the container transmitted by the processor includes a data packet associated with a checksum error; and transmitting, from the modem to the processor, the data packet associated with the checksum error separately from the container, wherein the container excludes the data packet associated with the checksum error.

Aspect 10: The method of any of Aspects 1 through 9, wherein grouping, at the modem of the device, based at least in part on the one or more characteristics, the data packets associated with the connection into the container is based at least in part on a communication of data packets with another device via a local area network (LAN).

Aspect 11: The method of any of Aspects 1 through 10, further comprising: determining, at the modem, based at least in part on the one or more characteristics, that one or more sizes of one or more headers associated with subsequent data packets satisfies a threshold; and determining, at the modem, based at least in part on the one or more sizes of the one or more headers satisfying the threshold, to not group the subsequent data packets into any containers.

Aspect 12: The method of any of Aspects 1 through 11, further comprising: determining, at the modem, based at least in part on the one or more characteristics, that a data packet associated with the connection indicates a special flag: and grouping the data packet indicating the special flag with the data packets associated with the connection into the container.

Aspect 13: The method of any of Aspects 1 through 12, further comprising: determining, at the modem, based at least in part on the one or more characteristics, that a data packet associated with the connection indicates a special flag: and transmitting, from the modem to the processor, based at least in part on the container not being available, the data packet outside of the container.

Aspect 14: The method of any of Aspects 1 through 13, wherein a single event ring between the processor and the modem provides an in-order delivery of the data packets between the modem and the processor, irrespective of whether the data packets are grouped and transmitted via a first channel interface or whether the data packets are not grouped and transmitted via a second channel interface.

Aspect 15: The method of any of Aspects 1 through 14, further comprising: negotiating, between the modem and the processor, one or more parameters associated with the grouping of the data packets associated with the container, wherein the one or more parameters include a maximum container size and a timer value for grouping the data packets.

Aspect 16: The method of any of Aspects 1 through 15, wherein the one or more characteristics associated with the modem or the data packets are related to one or more of: a buffer efficiency of a buffer associated with the modem, a quantity of active connections associated with the modem, a traffic pattern of the plurality of data packets received at the modem, context identifiers associated with the one or more connections for which the plurality of data packets are received, Internet Protocol identifiers associated with the plurality of data packets, checksum errors associated with the plurality of data packets, sizes of headers associated with the plurality of data packets, or a presence of special flags in the plurality of data packets.

Aspect 17: The method of any of Aspects 1 through 16, wherein the connection is a transmission control protocol (TCP) connection or a user datagram protocol (UDP) connection and the data packets are TCP packets or UDP packets, respectively.

Aspect 18: An apparatus for wireless communication at a device, comprising a processor; memory coupled with the processor; and instructions stored in the memory and executable by the processor to cause the apparatus to perform the method of one or more of Aspects 1-17.

Aspect 19: A device for wireless communication, comprising a memory and one or more processors coupled to the memory, the one or more processors configured to perform the method of one or more of Aspects 1-17.

Aspect 20: An apparatus for wireless communication, comprising at least one means for performing the method of one or more of Aspects 1-17.

Aspect 21: A non-transitory computer-readable medium storing code for wireless communication, the code comprising instructions executable by a processor to perform the method of one or more of Aspects 1-17.

Aspect 22: A non-transitory computer-readable medium storing a set of instructions for wireless communication, the set of instructions comprising one or more instructions that, when executed by one or more processors of a device, cause the device to perform the method of one or more of Aspects 1-17.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a "processor" is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, since those skilled in the art will understand that software and hardware can be designed to implement the systems or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (for example, if used in combination with "either" or "only one of").

What is claimed is:

1. An apparatus for wireless communication at a device, comprising:
a memory;
a processor; and a modem configured to:
  receive a plurality of data packets associated with one or more connections;
  negotiate, with the processor, a timer value for grouping data packets, of the plurality of data packets, associated with a container;
  group the data packets associated with a connection, of the one or more connections, into the container based at least in part on one or more characteristics associated with the modem or the data packets and based at least in part on the timer value; and
  transmit, to the processor, the container of the grouped data packets; and
the processor configured to:
  transmit, to the modem, an indication that subsequent data packets associated with the connection are to not be grouped by the modem into any containers based at least in part on a buffer efficiency of a buffer associated with the connection being less than a threshold, the buffer efficiency of the buffer corresponding to a size of a grouped frame divided by a full size of the buffer.

2. The apparatus of claim 1, wherein the threshold is a first threshold;
wherein the processor is further configured to:
  determine, based at least in part on the one or more characteristics, that a quantity of connections associated with the modem satisfies a second threshold; and
wherein the processor, to transmit the indication, is configured to:
  transmit the indication based at least in part on the quantity of connections satisfying the second threshold.

3. The apparatus of claim 1, wherein the processor is further configured to:
  determine, based at least in part on the one or more characteristics, traffic patterns between the one or more connections; and
wherein the processor, to transmit the indication, is configured to:
  transmit the indication based at least in part on the traffic patterns between the one or more connections.

4. The apparatus of claim 1, wherein the processor is further configured to:
  associate, based at least in part on the one or more characteristics, the connection with a context identifier, wherein the context identifier is associated with a context included in a plurality of contexts, and wherein other contexts included in the plurality of contexts are interchangeable between other active connections associated with the modem; and
  transmit, to the modem, an indication that the connection is associated with the context identifier.

5. The apparatus of claim 4, wherein the plurality of contexts are partitioned between different protocol types associated with connections, reservations, traffic entities, or packet data network levels, and wherein the plurality of contexts are partitioned based at least in part on a static configuration or a dynamic configuration.

6. The apparatus of claim 1, wherein:
the indication is a first indication;
the modem is further configured to:
  determine, based at least in part on the one or more characteristics, whether the grouped data packets are associated with incremental Internet Protocol (IP) identifiers; and
  transmit, to the processor, a second indication that indicates whether the grouped data packets are associated with the incremental IP identifiers; and
the processor is further configured to perform a re-segmentation of the data packets based at least in part on the second indication.

7. The apparatus of claim 1, wherein:
the modem is further configured to determine, based at least in part on the one or more characteristics, that the container includes a data packet associated with a checksum error; and
the processor is further configured to remove or resolve the data packet associated with the checksum error included in the container.

8. The apparatus of claim 1, wherein the modem is further configured to:
  determine, based at least in part on the one or more characteristics, that the container includes a data packet associated with a checksum error; and
  transmit, to the processor, the data packet associated with the checksum error separately from the container, wherein the container excludes the data packet associated with the checksum error.

9. The apparatus of claim 1, wherein the modem, to group the data packets associated with the connection into the container, is configured to group the data packets associated with the connection into the container based at least in part on a communication of data packets with another device via a local area network (LAN).

10. The apparatus of claim 1, wherein the threshold is a first threshold; and
wherein the modem is further configured to:
  determine, based at least in part on the one or more characteristics, that one or more sizes of one or more headers associated with the subsequent data packets satisfies a second threshold; and
  determine, based at least in part on the one or more sizes of the one or more headers satisfying the second threshold, to not group the subsequent data packets into any containers.

11. The apparatus of claim 1, wherein the modem is further configured to:
  determine, based at least in part on the one or more characteristics, that a data packet associated with the connection indicates a special flag; and
  group the data packet indicating the special flag with the data packets associated with the connection into the container.

12. The apparatus of claim 1, wherein the modem is further configured to:
  determine, based at least in part on the one or more characteristics, that a data packet associated with the connection indicates a special flag; and
  transmit, to the processor, the data packet outside of the container based at least in part on the container not being available.

13. The apparatus of claim 1, wherein a single event ring between the processor and the modem provides an in-order delivery of the data packets between the modem and the processor, irrespective of whether the data packets are grouped and transmitted via a first channel interface or whether the data packets are not grouped and transmitted via a second channel interface.

14. The apparatus of claim 1, wherein the modem and the processor are configured to negotiate one or more parameters associated with the grouped data packets, wherein the one or more parameters include a maximum container size and the timer value.

15. The apparatus of claim 1, wherein the one or more characteristics associated with the modem or the data packets are related to one or more of: the buffer efficiency of the buffer, a quantity of active connections associated with the modem, a traffic pattern of the plurality of data packets received at the modem, context identifiers associated with the one or more connections for which the plurality of data packets are received, Internet Protocol identifiers associated with the plurality of data packets, checksum errors associated with the plurality of data packets, sizes of headers associated with the plurality of data packets, or a presence of special flags in the plurality of data packets.

16. The apparatus of claim 1, wherein the connection is a transmission control protocol (TCP) connection or a user datagram protocol (UDP) connection and the data packets are TCP packets or UDP packets, respectively.

17. The apparatus of claim 1, wherein:
determining that the buffer efficiency of the buffer is less than the threshold is based at least in part on the connection being infrequent; and
transmitting the indication that the subsequent data packets associated with the connection are to not be grouped by the modem into any containers is based at least in part on the connection being infrequent.

18. A method of wireless communication performed by a device, comprising:
receiving, at a modem of the device, a plurality of data packets associated with one or more connections;
negotiating, with a processor of the device, a timer value for grouping data packets, of the plurality of data packets, associated with a container;
grouping, at the modem, the data packets associated with a connection, of the one or more connections, into the container based at least in part on one or more characteristics associated with the modem or the data packets and based at least in part on the timer value;
transmitting, from the modem to the processor, the container of the grouped data packets; and
transmitting, from the processor to the modem, an indication that subsequent data packets associated with the connection are to not be grouped by the modem into any containers based at least in part on a buffer efficiency of a buffer associated with the connection being less than a threshold, the buffer efficiency of the buffer corresponding to a size of a grouped frame divided by a full size of the buffer.

19. The method of claim 18, wherein the threshold is a first threshold;
wherein the method further comprises:
determining, at the processor, based at least in part on the one or more characteristics, that a quantity of connections associated with the modem satisfies a second threshold; and
wherein transmitting the indication that the subsequent data packets associated with the connection are to not be grouped by the modem into any containers is further based at least in part on the quantity of connections satisfying the second threshold.

20. The method of claim 18, further comprising:
determining, at the processor, based at least in part on the one or more characteristics, traffic patterns between the one or more connections, wherein transmitting the indication that the subsequent data packets associated with the connection are to not be grouped by the modem into any containers is further based at least in part on the traffic patterns between the one or more connections.

21. The method of claim 18, further comprising:
associating, at the processor, based at least in part on the one or more characteristics, the connection with a context identifier, wherein:
the context identifier is associated with a context included in a plurality of contexts;
other contexts included in the plurality of contexts are interchangeable between other active connections associated with the modem;
the plurality of contexts are partitioned between different protocol types associated with connections, reservations, traffic entities, or packet data network levels; and
the plurality of contexts are partitioned based at least in part on a static configuration or a dynamic configuration; and
transmitting, from the processor to the modem, an indication that the connection is associated with the context identifier.

22. The method of claim 18, wherein the indication is a first indication; and
wherein the method further comprises:
determining, at the modem, based at least in part on the one or more characteristics, whether the grouped data packets are associated with incremental Internet Protocol (IP) identifiers;
transmitting, from the modem to the processor, a second indication that indicates whether the grouped data packets are associated with the incremental IP identifiers; and
performing, at the processor, a re-segmentation of the data packets based at least in part on the second indication.

23. The method of claim 18, further comprising:
determining, at the modem, based at least in part on the one or more characteristics, that the container includes a data packet associated with a checksum error; and
removing or resolving, at the processor, the data packet associated with the checksum error included in the container.

24. The method of claim 18, further comprising:
determining, at the modem, based at least in part on the one or more characteristics, that the container includes a data packet associated with a checksum error; and
transmitting, from the modem to the processor, the data packet associated with the checksum error separately from the container, wherein the container excludes the data packet associated with the checksum error.

25. The method of claim 18, wherein:
grouping, at the modem of the device the data packets associated with the connection into the container is further based at least in part on a communication of data packets with another device via a local area network (LAN);
a single event ring between the processor and the modem provides an in-order delivery of the data packets between the modem and the processor, irrespective of whether the data packets are grouped and transmitted via a first channel interface or whether the data packets are not grouped and transmitted via a second channel interface; or the connection is a transmission control protocol (TCP) connection or a user datagram protocol (UDP) connection and the data packets are TCP packets or UDP packets, respectively.

26. The method of claim 18, wherein the threshold is a first threshold; and wherein the method further comprises:
   determining, at the modem, based at least in part on the one or more characteristics, that one or more sizes of one or more headers associated with the subsequent data packets satisfies a second threshold; and
   determining, at the modem, based at least in part on the one or more sizes of the one or more headers satisfying the second threshold, to not group the subsequent data packets into any containers.

27. The method of claim 18, further comprising:
determining, at the modem, based at least in part on the one or more characteristics, that a data packet associated with the connection indicates a special flag; and
grouping the data packet indicating the special flag with the data packets associated with the connection into the container.

28. The method of claim 18, further comprising:
determining, at the modem, based at least in part on the one or more characteristics, that a data packet associated with the connection indicates a special flag; and
transmitting, from the modem to the processor, based at least in part on the container not being available, the data packet outside of the container.

29. The method of claim 18, wherein:
one or more parameters associated with the grouped data packets associated with the container are negotiated between the modem and the processor, wherein the one or more parameters include a maximum container size and the timer value for grouping the data packets; or the one or more characteristics associated with the modem or the data packets are related to one or more of: the buffer efficiency of the buffer, a quantity of active connections associated with the modem, a traffic pattern of the plurality of data packets received at the modem, context identifiers associated with the one or more connections for which the plurality of data packets are received, Internet Protocol identifiers associated with the plurality of data packets, checksum errors associated with the plurality of data packets, sizes of headers associated with the plurality of data packets, or a presence of special flags in the plurality of data packets.

30. The method of claim 18, wherein the connection is a transmission control protocol (TCP) connection or a user datagram protocol (UDP) connection and the data packets are TCP packets or UDP packets, respectively.

* * * * *